(12) United States Patent
Wu et al.

(10) Patent No.: US 10,495,850 B2
(45) Date of Patent: Dec. 3, 2019

(54) OPTICAL IMAGE CAPTURING LENS ASSEMBLY, IMAGING APPARATUS AND ELECTRONIC DEVICE

(71) Applicant: LARGAN PRECISION CO., LTD., Taichung (TW)

(72) Inventors: Chien-Hsun Wu, Taichung (TW); Tzu-Chieh Kuo, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 188 days.

(21) Appl. No.: 15/685,247

(22) Filed: Aug. 24, 2017

(65) Prior Publication Data

US 2018/0299647 A1  Oct. 18, 2018

(30) Foreign Application Priority Data

Apr. 17, 2017 (TW) .............................. 106112749 A

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ......... G02B 9/62; G02B 9/64; G02B 13/0045
See application file for complete search history.

(56) References Cited

U.S. PATENT DOCUMENTS

| 4,815,831 A | 3/1989 | Betensky |
| 5,309,286 A | 5/1994 | Abe et al. |
| 5,991,088 A | 11/1999 | Mizouchi |
| 8,335,043 B2 | 12/2012 | Huang |
| 2015/0022905 A1 | 1/2015 | Shinohara et al. |
| 2015/0124333 A1 | 5/2015 | Noda et al. |
| 2015/0168692 A1 | 6/2015 | Kitahara |
| 2016/0124185 A1 | 5/2016 | Tang et al. |
| 2016/0139367 A1 | 5/2016 | Jung |
| 2016/0161719 A1* | 6/2016 | Son ........................ G02B 9/62 359/713 |
| 2016/0259150 A1 | 9/2016 | Shin et al. |
| 2016/0341928 A1 | 11/2016 | Liu et al. |
| 2016/0341933 A1 | 11/2016 | Liu et al. |
| 2017/0045718 A1 | 2/2017 | Park |
| 2017/0123186 A1 | 5/2017 | Shin et al. |

(Continued)

FOREIGN PATENT DOCUMENTS

| CN | 101359087 A | 2/2009 |
| CN | 106405794 A | 2/2017 |
| CN | 106597637 A | 4/2017 |

(Continued)

*Primary Examiner* — Darryl J Collins
*Assistant Examiner* — Journey F Sumlar
(74) *Attorney, Agent, or Firm* — Locke Lord LLP; Tim Tingkang Xia, Esq.

(57) ABSTRACT

An optical image capturing lens assembly includes six lens elements, the six lens elements being, in order from an object side to an image side: a first lens element with negative refractive power, a second lens element with positive refractive power, a third lens element with negative refractive power, a fourth lens element with positive refractive power, a fifth lens element, and a sixth lens element with negative refractive power.

33 Claims, 27 Drawing Sheets

(56) References Cited

U.S. PATENT DOCUMENTS

| | | |
|---|---|---|
| 2017/0269334 A1 | 9/2017 | Usui et al. |
| 2018/0348480 A1 | 12/2018 | Sekine |

FOREIGN PATENT DOCUMENTS

| | | |
|---|---|---|
| EP | 3006976 A1 | 4/2016 |
| JP | 1993-173064 | 7/1993 |
| JP | 2005-352060 A | 12/2005 |
| JP | 2009-204997 A | 9/2009 |
| JP | 2014-010399 A | 1/2014 |
| JP | 2014-010400 A | 1/2014 |
| JP | 2014-010401 A | 1/2014 |
| JP | 2015041012 A | 3/2015 |
| TW | I580999 B | 5/2017 |

\* cited by examiner

OPTICAL IMAGE CAPTURING LENS ASSEMBLY, IMAGING APPARATUS AND ELECTRONIC DEVICE

RELATED APPLICATIONS

This application claims priority to Taiwan Application Serial Number 106112749, filed on Apr. 17, 2017, which is incorporated by reference herein in its entirety.

BACKGROUND

Technical Field

The present disclosure relates to an optical image capturing lens assembly and an imaging apparatus, and more particularly, to an optical image capturing lens assembly and an imaging apparatus applicable to electronic devices.

Description of Related Art

As technology improves, electronic products with camera functions are becoming increasingly diversified, such as vehicle imaging apparatus, unmanned aerial vehicles (such as drones) and wearable devices, etc. Owing to wide applications of electronic products, demands for camera functions are also increased, so photographing modules need to provide high image quality. In addition, due to the diversification of multi-function electronic devices and the booming development of portable electronic devices, there is a need for light and compact photographing modules. Furthermore, the immense applications of vehicle imaging apparatus and unmanned aerial vehicles demand wide fields of view and abilities to adjust to various environments; thus, photographing modules having wide field of view must be configured, as well as appropriate materials are selected to reduce the effects of environments on the image quality.

Therefore, how to achieve wide-angle photographing modules having good image quality and compact size becomes a challenge for existing technology. Therefore, different technologies to satisfy the requirements for compact wide-angle photographing modules with high image qualities are desired.

SUMMARY

According to one aspect of the present disclosure, an optical image capturing lens assembly includes six lens elements, the six lens elements being, in order from an object side to an image side: a first lens element with negative refractive power; a second lens element with positive refractive power; a third lens element with negative refractive power; a fourth lens element with positive refractive power; a fifth lens element having an image-side surface being concave in a paraxial region thereof; and a sixth lens element with negative refractive power having an image-side surface being concave in a paraxial region thereof, the image-side surface of the sixth lens element being aspheric and having at least one critical point in an off-axis region thereof; wherein an axial distance between the third lens element and the fourth lens element is T34, an axial distance between the fourth lens element and the fifth lens element is T45, an axial distance between the fifth lens element and the sixth lens element is T56, and the following condition is satisfied:

$0.45 < T56/(T34+T45)$.

According to another aspect of the present disclosure, an imaging apparatus includes the aforementioned optical image capturing lens assembly and an image sensor.

According to another aspect of the present disclosure, an electronic device includes the aforementioned imaging apparatus.

According to another aspect of the present disclosure, an optical image capturing lens assembly includes six lens elements, the six lens elements being, in order from an object side to an image side: a first lens element with negative refractive power; a second lens element with positive refractive power; a third lens element with negative refractive power; a fourth lens element with positive refractive power; a fifth lens element having an image-side surface being concave in a paraxial region thereof, at least one surface of an object-side surface and the image-side surface of the fifth lens element being aspheric and having at least one critical point in an off-axis region thereof; and a sixth lens element with negative refractive power; wherein an axial distance between the third lens element and the fourth lens element is T34, an axial distance between the fourth lens element and the fifth lens element is T45, an axial distance between the fifth lens element and the sixth lens element is T56, and the following condition is satisfied:

$0.55 < T56/(T34+T45) < 32$.

According to another aspect of the present disclosure, an optical image capturing lens assembly includes six lens elements, the six lens elements being, in order from an object side to an image side: a first lens element with negative refractive power; a second lens element with positive refractive power; a third lens element with negative refractive power; a fourth lens element with positive refractive power; a fifth lens element; and a sixth lens element with negative refractive power having an image-side surface being concave in a paraxial region thereof, the image-side surface of the sixth lens element being aspheric and having at least one critical point in an off-axis region thereof; wherein an axial distance between the third lens element and the fourth lens element is T34, an axial distance between the fourth lens element and the fifth lens element is T45, an axial distance between the fifth lens element and the sixth lens element is T56, a curvature radius of an object-side surface of the first lens element is R1, a curvature radius of an image-side surface of the third lens element is R6, and the following conditions are satisfied:

$1.1 < T56/(T34+T45) < 20$; and $0.60 < R1/R6 < 19$.

According to yet another aspect of the present disclosure, an optical image capturing lens assembly includes six lens elements, the six lens elements being, in order from an object side to an image side: a first lens element with negative refractive power; a second lens element with positive refractive power; a third lens element with negative refractive power; a fourth lens element with positive refractive power; a fifth lens element having an image-side surface being concave in a paraxial region thereof; and a sixth lens element with negative refractive power having an image-side surface being aspheric, and the image-side surface of the sixth lens element having at least one critical point in an off-axis region thereof; wherein an axial distance between the third lens element and the fourth lens element is T34, an axial distance between the fourth lens element and the fifth lens element is T45, an axial distance between the fifth lens element and the sixth lens element is T56, a vertical distance between a maximum effective diameter position on an object-side surface of the first lens element and an optical axis is Y11, a vertical distance between the at least one critical point closet to the optical axis in the off-axis region of the image-side surface of the sixth lens element and the optical axis is Yc62, and the following conditions are satisfied:

$$0.10 < T56/(T34+T45); \text{ and}$$

$$0.15 < Yc62/Y11 < 0.90.$$

DETAILED DESCRIPTION

Figure 1A:
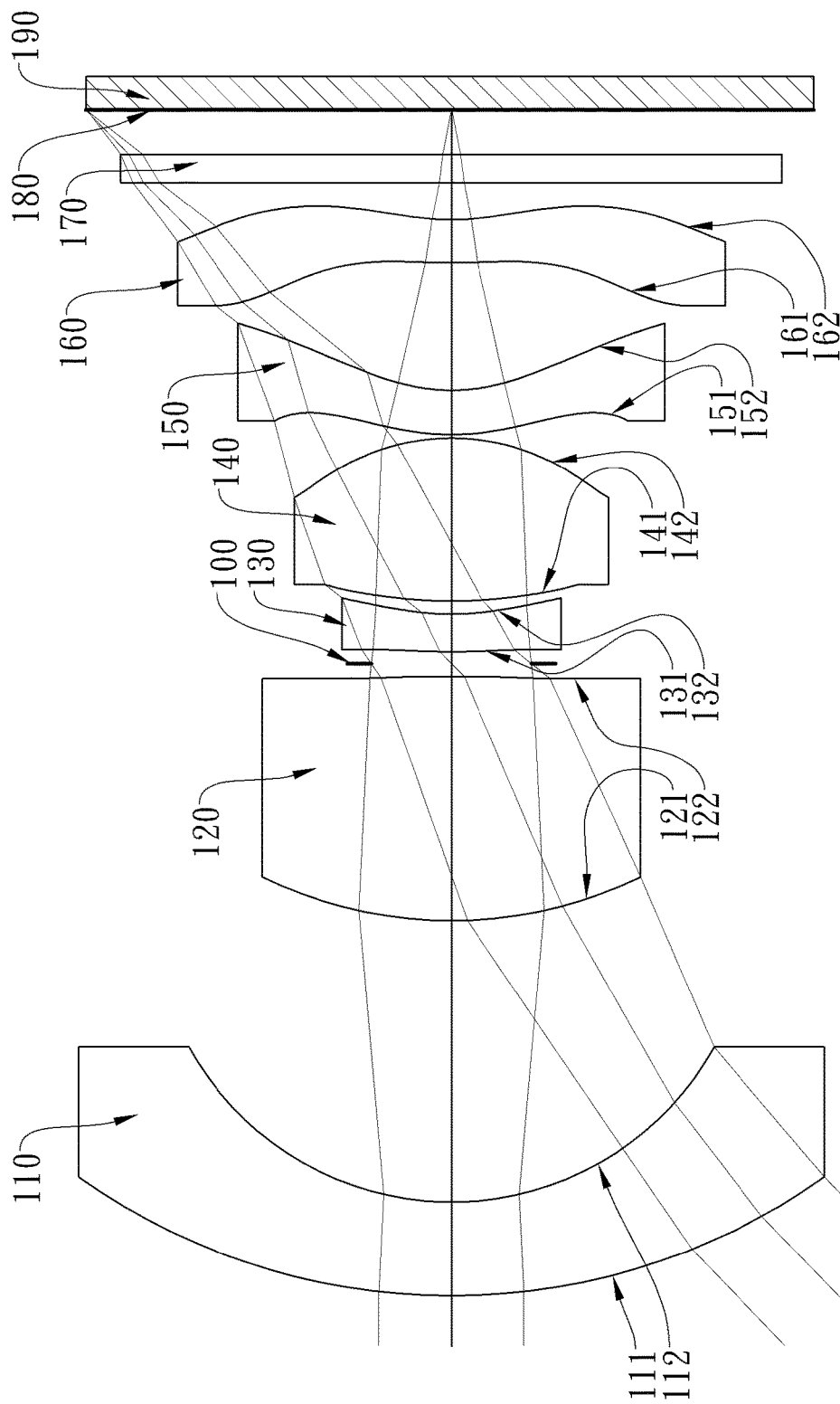
FIG. 1A is a schematic view of an imaging apparatus according to the 1st embodiment of the present disclosure.

The present disclosure provides an optical image capturing lens assembly including six lens elements. The six lens elements are, from an object side to an image side, a first lens element, a second lens element, a third lens element, a fourth lens element, a fifth lens element and a sixth lens element.

The first lens element has negative refractive power, which can provide the optical image capturing lens assembly with a wide field of view. The first lens element may have an object-side surface being convex in a paraxial region thereof, which is favorable for reducing the incident angle of peripheral light at the first lens element so as to reduce the surface reflection, thus the optical image capturing lens assembly can be applicable to a wide angle design.

The second lens element has positive refractive power, which can balance the aberrations caused by the first lens element and shorten a total track length of the optical image capturing lens assembly.

The third lens element has negative refractive power, which can disperse the negative refractive power of the optical image capturing lens assembly and reduce the sensitivity so as to increase manufacturing yield. The third lens element may have an image-side surface being concave in a paraxial region thereof to provide the third lens element with sufficient negative refractive power and favorably reduce field curvature.

The fourth lens element has positive refractive power, which can shorten the total track length of the optical image capturing lens assembly. The fourth lens element may have an object-side surface being convex in a paraxial region thereof to provide the fourth lens with sufficient positive refractive power, in order to shorten the total track length. The fourth lens element may have an image-side surface being convex in a paraxial region thereof to provide the fourth lens with sufficient positive refractive power and reduce surface reflection so as to enhance illumination on an image surface.

The fifth lens element may have negative refractive power, which can correct aberrations in cooperation with the fourth lens element. The fifth lens element may have an image-side surface being concave in a paraxial region thereof so as to shorten the total track length of the optical image capturing lens assembly and correct aberrations in an off-axis region by cooperation between the shapes of the fifth lens element and the sixth lens element. At least one surface of an object-side surface and the image-side surface of the fifth lens element may have at least one critical point in an off-axis region thereof, thus aberrations in the off-axis region can be corrected while reducing the volume of the optical image capturing lens assembly. Preferably, the at least one critical point may be positioned at the object-side surface of the fifth lens element, which is favorable for reducing the surface reflection of the peripheral light.

The sixth lens element has negative refractive power, which can correct Petzval sum so as to make the image surface even flatter and correct astigmatism, thus image distortion can be avoided. The sixth lens element may have an object-side surface being convex in a paraxial region thereof to further correct astigmatism. The sixth lens element may have an image-side surface being concave in a paraxial region thereof to favorably correct astigmatism and reduce a back focal length. The image-side surface of the sixth lens element may have at least one critical point in an off-axis region thereof, which can further correct aberrations in the off-axis region, such as field curvature. Preferably, the at least one critical point may include at least one convex critical point, which can further correct astigmatism and field curvature in the off-axis region so as to increase the sharpness. Also, relative illumination on the periphery of the image surface can be enhanced.

When at least one lens element of the first lens element and the second lens element is made of glass, it can favorably reduce the effect of environment on the image quality.

When an axial distance between the third lens element and the fourth lens element is T34, an axial distance between the fourth lens element and the fifth lens element is T45, an axial distance between the fifth lens element and the sixth lens element is T56, and the following condition is satisfied: $0.10<T56/(T34+T45)$, it can configure appropriate axial distances between every two adjacent lens elements in the rear of the optical image capturing lens assembly, so as to provide sufficient distance between the fifth lens element and the sixth lens element, thus aberrations in the off-axis region can be corrected. Also, cooperation between the third lens element, the fourth lens element and the fifth lens element can be provided so as to ensure sufficient wide field of view and favorably correct aberrations in the off-axis region. Preferably, the following condition can be satisfied: $0.45<T56/(T34+T45)$. Preferably, the following condition can be satisfied: $0.55<T56/(T34+T45)<32$, it can further adjust the axial distances between every two adjacent lens elements in the rear of the optical image capturing lens assembly to balance between correcting aberrations and maintaining the total track length of the optical image capturing lens assembly. Preferably, the following condition can be satisfied: $0.65<T56/(T34+T45)<28$. Preferably, the following condition can be satisfied: $0.85<T56/(T34+T45)<24$. Preferably, the following condition can be satisfied: $1.1<T56/(T34+T45)<20$.

When a curvature radius of the object-side surface of the first lens element is R1, a curvature radius of the image-side surface of the third lens element is R6, and the following condition can be satisfied: $0.60<R1/R6<19$, it can properly adjust the surface shapes of the first lens element and the third lens element to provide the optical image capturing lens assembly with sufficient negative refractive power, thus the field of view can be increased and aberrations can be corrected. Preferably, the following condition can be satisfied: $0.76<R1/R6<12.7$. Preferably, the following condition can be satisfied: $0.76<R1/R6<5.0$.

When a vertical distance between a maximum effective diameter position on the object-side surface of the first lens element and an optical axis is Y11, a vertical distance between the at least one critical point closet to the optical axis in the off-axis region of the image-side surface of the sixth lens element and the optical axis is Yc62, and the following condition can be satisfied: $0.15<Yc62/Y11<0.90$, it can adjust outer diameter of the first lens element and surface shape of the sixth lens element to further correct aberration in the off-axis region and compress the volume of the optical image capturing lens assembly. Preferably, the following condition can be satisfied: $0.20<Yc62/Y11<0.80$. Preferably, the following condition can be satisfied: $0.25<Yc62/Y11<0.67$.

When an Abbe number of the third lens element is V3, an Abbe number of the fourth lens element is V4, and the following condition can be satisfied: $65<V3+V4$, it can adjust the materials of the third lens element and the fourth lens element in order to correct aberrations caused by the optical image capturing lens assembly.

When an axial distance between the first lens element and the second lens element is T12, a central thickness of the first lens element is CT1, and the following condition can be satisfied: $0.85<T12/CT1$, it can appropriately adjust a ratio of the thickness of the first lens element to the axial distance between the first lens element and the second lens element in order to balance between enlarging the field of view and reducing aberrations. Preferably, the following condition can be satisfied: $1.2<T12/CT1$.

When the axial distance between the fifth lens element and the sixth lens element is T56, a central thickness of the sixth lens element is CT6, and the following condition can be satisfied: $0.54<T56/CT6<6.5$, it can ensure a sufficient distance between the fifth lens element and the sixth lens element and an appropriate thickness of the sixth lens element in order to correct aberrations in the off-axis region. Preferably, the following condition can be satisfied: $1.0<T56/CT6<5.5$. Preferably, the following condition can be satisfied: $1.5<T56/CT6<5.0$.

When an axial distance between the object-side surface of the first lens element and an image-side surface of the second lens element is Dr1r4, an axial distance between an object-side surface of the third lens element and the image-side surface of the sixth lens element is Dr5r12, and the following condition can be satisfied: $0.55<Dr1r4/Dr5r12<3.5$, it can adjust a ratio of the length between the front and the rear of the optical capturing image lens assembly in order to balance between enlarging the field of view and improving the imaging quality. Preferably, the following condition can be satisfied: $0.68<Dr1r4/Dr5r12<3.0$. Preferably, the following condition can be satisfied: $0.78<Dr1r4/Dr5r12<2.5$.

When the axial distance between the fifth lens element and the sixth lens element is T56, a displacement in parallel with the optical axis from an axial vertex on the image-side surface of the fifth lens element to a maximum effective diameter position on the image-side surface of the fifth lens element is SAG52, a displacement in parallel with the optical axis from an axial vertex on the object-side surface of the sixth lens element to a maximum effective diameter position on the object-side surface of the sixth lens element is SAG61, wherein the sign of the displacement is positive toward the image-side and negative toward the object-side, and the following condition can be satisfied: $(T56-SAG52+SAG61)/T56<0.75$, it can adjust the surface shapes of the fifth lens element and the sixth lens element in order to correct aberrations in the off-axis region. Preferably, the following condition can be satisfied:

$$(T56-SAG52+SAG61)/T56<0.50.$$

When a focal length of the second lens element is f2, a focal length of the fourth lens element is f4, and the following condition can be satisfied: $0.78<f2/f4<4.0$, it can provide the optical image capturing lens assembly with a sufficient positive refractive power and an appropriate distribution of refractive power, so as to shorten the total track length of the optical image capturing lens assembly and reducing the sensitivity thereof.

When a focal length of the fifth lens element is f5, a focal length of the sixth lens element is f6, and the following condition can be satisfied: $|f6/f5|<0.75$, it can provide a cooperation between the fifth lens element and the sixth lens element in order to correct aberrations in the off-axis region.

When a curvature radius of the object-side surface of the third lens element is R5, the curvature radius of the image-side surface of the third lens element is R6, and the following condition can be satisfied: $0<R6/|R5|<0.55$, it can adjust the surface shape of the third lens element in order to reduce the generation of astigmatism.

When a curvature radius of the image-side surface of the sixth lens element is R12, a focal length of the optical image capturing lens assembly is f, and the following condition can be satisfied: $0<R12/f<5.0$, it can further reduce astigmatism and field curvature and compress the back focal length in order to shorten the total track length of the optical image capturing lens assembly. Preferably, the following condition can be satisfied: $0<R12/f<3.0$. Preferably, the following condition can be satisfied: $0<R12/f<1.2$.

When the Abbe number of the third lens element is V3, an Abbe number of the fifth lens element is V5, an Abbe number of the sixth lens element is V6, and the following conditions can be satisfied: $10<V3<40$; $10<V5<40$; and $10<V6<40$, they can reduce chromatic aberrations to reduce color casts and properly dispose the materials in order to correct other types of aberrations.

According to the optical image capturing lens assembly of the present disclosure, the definition of the critical point is a point on the surface of the lens element where the tangential plane of the point is perpendicular to the optical axis.

According to the optical image capturing lens assembly of the present disclosure, the lens elements thereof can be made of glass or plastic. When the lens elements are made of glass, the distribution of the refractive power of the optical image capturing lens assembly is more flexible to design. When the lens elements are made of plastic, the manufacturing cost can be effectively reduced. Furthermore, surfaces of each lens element can be arranged to be aspheric (ASP). As aspheric surfaces can be easily formed into shapes other than spherical shapes, more controllable variables can be obtained to eliminate aberrations and to further decrease the required number of lens elements, and consequently, the total track length of the optical image capturing lens assembly can be effectively reduced.

According to the optical image capturing lens assembly of the present disclosure, it can include at least one stop, such as an aperture stop, a glare stop or a field stop, so as to favorably reduce the amount of stray light and thereby improve the image quality.

According to the optical image capturing lens assembly of the present disclosure, a stop can be configured as a front stop or a middle stop. A front stop disposed between an imaged object and the first lens element can provide a longer distance between an exit pupil of the optical image capturing lens assembly and the image surface, so that the generated telecentric effect can improve the image-sensing efficiency of an image sensor, such as a CCD or CMOS sensor. A middle stop disposed between the first lens element and the image surface is favorable for enlarging the field of view of the optical image capturing lens assembly, thereby providing the optical image capturing lens assembly with the advantages of a wide-angle lens.

According to the optical image capturing lens assembly of the present disclosure, when the lens element has a convex surface and the region of convex shape is not defined, it indicates that the surface can be convex in the paraxial region thereof when the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical image capturing lens assembly of the present disclosure, the image surface of the optical image capturing lens assembly, based on the corresponding image sensor, can be a plane or a curved surface with any curvature, especially a curved surface being concave facing towards the object side. In addition, at least one image correcting element (such as a field flattener) can be selectively disposed between a lens element closet to the image surface and the image surface so as to correct the image (such as the field curvature). Properties of the image correcting element, such as curvature, thickness, refractive index, position, surface shape (convex/concave, spherical/aspheric, diffractive/Fresnel etc.) can be adjusted according to the requirements of the imaging apparatus. In general, the image correcting element is preferably a thin plano-concave element having a concave surface toward the object side and is disposed close to the image surface.

According to the above description of the present disclosure, the following 1st-12th specific embodiments and the corresponding figures thereof are provided for further explanation.

1st Embodiment

Figure 1B:
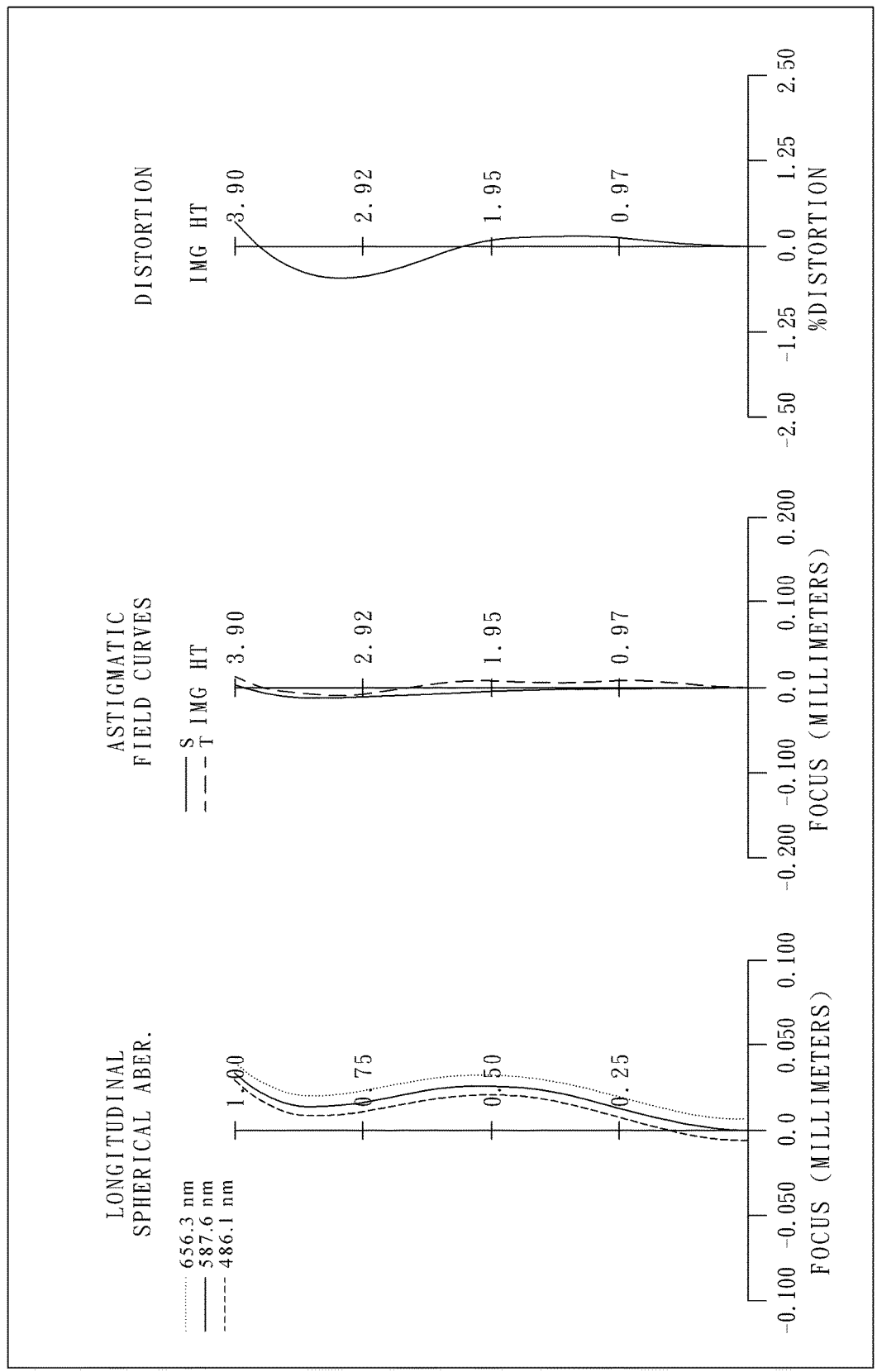
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an optical image capturing lens assembly (not otherwise herein labeled) of the present disclosure and an image sensor 190. The optical image capturing lens assembly includes, in order from an object side to an image side, a first lens element 110, a second lens element 120, an aperture stop 100, a third lens element 130, a fourth lens element 140, a fifth lens element 150 and a sixth lens element 160, wherein the optical image capturing lens assembly includes six lens elements (110, 120, 130, 140, 150, and 160) with no additional lens element disposed between the first lens element 110 and the sixth lens element 160.

The first lens element 110 with negative refractive power has an object-side surface 111 being convex in a paraxial region thereof and an image-side surface 112 being concave in a paraxial region thereof, and the first lens element 110 is made of glass.

The second lens element 120 with positive refractive power has an object-side surface 121 being convex in a paraxial region thereof and an image-side surface 122 being convex in a paraxial region thereof, and the second lens element 120 is made of glass.

The third lens element 130 with negative refractive power has an object-side surface 131 being convex in a paraxial region thereof and an image-side surface 132 being concave in a paraxial region thereof, which are both aspheric, and the third lens element 130 is made of plastic.

The fourth lens element 140 with positive refractive power has an object-side surface 141 being convex in a paraxial region thereof and an image-side surface 142 being convex in a paraxial region thereof, which are both aspheric, and the fourth lens element 140 is made of plastic.

The fifth lens element 150 with negative refractive power has an object-side surface 151 being convex in a paraxial region thereof and an image-side surface 152 being concave in a paraxial region thereof, which are both aspheric, and the fifth lens element 150 is made of plastic. Moreover, the object-side surface 151 has at least one critical point in an off-axis region thereof.

The sixth lens element 160 with negative refractive power has an object-side surface 161 being convex in a paraxial region thereof and an image-side surface 162 being concave in a paraxial region thereof, which are both aspheric, and the sixth lens element 160 is made of plastic. Moreover, the image-side surface 162 has at least one critical point including at least one convex critical point in an off-axis region thereof.

An IR-cut filter 170 is located between the sixth lens element 160 and an image surface 180. The IR-cut filter 170 is made of glass and it does not affect the focal length of the optical image capturing lens assembly. The image sensor 190 is disposed on or near the image surface 180 of the optical image capturing lens assembly.

Figure 11:
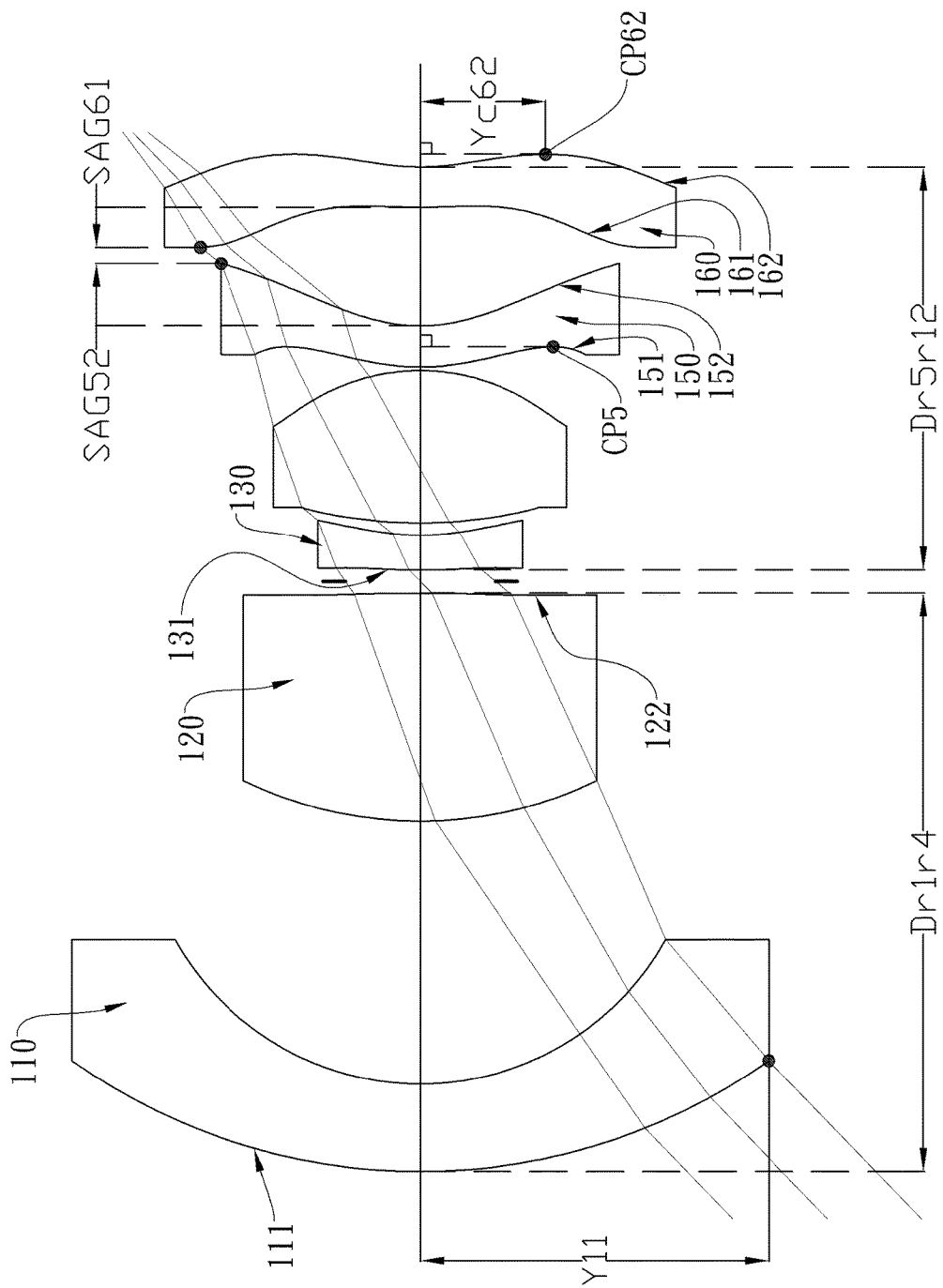
FIG. 11 is a schematic view showing critical points and parameters Dr1r4, Dr5r12, SAG52, SAG61, Y11 and Yc62 of the imaging apparatus according to the 1st embodiment.

Please refer to FIG. 11. FIG. 11 is a schematic view of an example according to the 1st embodiment, wherein the fifth lens element 150 has a critical point CP5 in an off-axis region thereof; the image-side surface 162 of the sixth lens element 160 has a critical point CP62 in the off-axis region thereof; an axial distance between the object-side surface 111 of the first lens element 110 and the image-side surface 122 of the second lens element 120 is Dr1r4; an axial distance between the object-side surface 131 of the third lens element 130 and the image-side surface 162 of the sixth lens element 160 is Dr5r12; a displacement in parallel with an optical axis from an axial vertex on the image-side surface 152 of the fifth lens element 150 to a maximum effective diameter position on the image-side surface 152 of the fifth lens element 150 is SAG52; a displacement in parallel with the optical axis from an axial vertex on the object-side surface 161 of the sixth lens element 160 to a maximum effective diameter position on the object-side surface 161 of the sixth lens element 160 is SAG61; a vertical distance between a maximum effective diameter position on the object-side surface 111 of the first lens element 110 and the optical axis is Y11; and a vertical distance between the critical point CP62 closet to the optical axis in the off-axis region of the image-side surface 162 of the sixth lens element 160 and the optical axis is Yc62. In this embodiment, the critical point CP5 is positioned at the object-side surface 151 of the fifth lens element 150 and is a concave critical point, the critical point CP62 is a convex critical point, SAG52 is oriented toward the image-side and is positive, and SAG61 is oriented toward the object-side and is negative. However, this embodiment is only exemplary but not limited thereto.

The detailed optical data of the 1st embodiment are shown in TABLE 1, wherein the units of the curvature radius, the thickness and the focal length are expressed in mm, and HFOV is defined as half of the maximum field of view, and surfaces #0 to #16 refer to the surfaces in order from the object side to the image side. The aspheric surface data of the 1st embodiment are shown in TABLE 2, wherein k is the conic coefficient in the equation of the aspheric surface profiles, and A4-A16 refer to the 4th to 16th aspheric coefficients. Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in following tables are the same as those of the parameters presented in TABLE 1 and TABLE 2 for the 1st embodiment; explanations in this regard will not be provided again.

TABLE 1

(1st Embodiment)
f = 4.01 mm, Fno = 2.59, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.863 | | 1.003 | Glass | 1.729 | 54.7 | −9.29 |
| 2 | | 3.200 | | 3.004 | | | | |
| 3 | Lens 2 | 4.591 | | 2.608 | Glass | 1.772 | 49.6 | 5.21 |
| 4 | | −24.626 | | 0.136 | | | | |
| 5 | Ape. Stop | Plano | | 0.128 | | | | |
| 6 | Lens 3 | 7.129 | ASP | 0.400 | Plastic | 1.660 | 20.4 | −6.55 |
| 7 | | 2.631 | ASP | 0.140 | | | | |
| 8 | Lens 4 | 4.684 | ASP | 1.741 | Plastic | 1.544 | 56.0 | 3.16 |
| 9 | | −2.360 | ASP | 0.040 | | | | |
| 10 | Lens 5 | 2.584 | ASP | 0.470 | Plastic | 1.566 | 37.4 | −16.25 |
| 11 | | 1.884 | ASP | 1.359 | | | | |
| 12 | Lens 6 | 7.187 | ASP | 0.460 | Plastic | 1.614 | 26.0 | −6.61 |
| 13 | | 2.530 | ASP | 0.400 | | | | |
| 14 | IR-cut filter | Plano | | 0.300 | Glass | 1.517 | 64.2 | — |
| 15 | | Plano | | 0.473 | | | | |
| 16 | Image surface | Plano | | — | | | | |

Note:
Reference wavelength is d-line 587.6 nm

TABLE 2

| Aspheric Coefficients | | | | |
|---|---|---|---|---|
| Surface # | 6 | 7 | 8 | 9 |
| k = | −5.6277E+01 | −1.4614E+00 | −4.8623E+01 | −7.6724E−01 |
| A4 = | −5.1924E−02 | −7.9946E−02 | 3.6478E−02 | −8.0680E−03 |
| A6 = | 2.8564E−02 | 3.8740E−02 | −4.7279E−02 | 1.8218E−03 |
| A8 = | −1.5034E−02 | −7.7979E−03 | 3.9218E−02 | −2.2773E−03 |
| A10 = | | −9.6898E−04 | −1.3903E−02 | 1.4758E−03 |
| A12 = | | 2.9739E−05 | 1.8766E−03 | −5.8680E−04 |
| A14 = | | | | 1.2402E−04 |
| Surface # | 10 | 11 | 12 | 13 |
| k = | −8.5255E+00 | −1.7859E+00 | −4.8720E+00 | −9.0108E+00 |
| A4 = | 1.3719E−02 | −2.2060E−02 | −1.0137E−01 | −5.4324E−02 |
| A6 = | −2.5396E−02 | −4.2431E−04 | 3.4897E−02 | 1.7451E−02 |
| A8 = | 1.1408E−02 | 1.5135E−03 | −1.0429E−02 | −4.5430E−03 |
| A10 = | −3.7403E−03 | −5.8729E−04 | 2.4091E−03 | 8.0900E−04 |
| A12 = | 6.7740E−04 | 1.2878E−04 | −3.2791E−04 | −8.9832E−05 |
| A14 = | −5.2944E−05 | −1.5004E−05 | 2.3129E−05 | 5.6069E−06 |
| A16 = | | 7.0349E−07 | −6.6249E−07 | −1.4917E−07 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the optical image capturing lens assembly is f, an f-number of the optical image capturing lens assembly is Fno, half of a maximum field of view of the optical image capturing lens assembly is HFOV, and these parameters have the following values: f=4.01 mm; Fno=2.59; HFOV=44.0 degrees.

In the 1st embodiment, an Abbe number of the third lens element 130 is V3, and it satisfies the condition: V3=20.4.

In the 1st embodiment, the Abbe number of the third lens element 130 is V3, an Abbe number of the fourth lens element 140 is V4, and they satisfy the condition: V3+V4=76.4.

In the 1st embodiment, an Abbe number of the fifth lens element 150 is V5 and it satisfies the condition: V5=37.4.

In the 1st embodiment, an Abbe number of the sixth lens element 160 is V6 and it satisfies the condition: V6=26.0.

In the 1st embodiment, the axial distance between the object-side surface 111 of the first lens element 110 and the image-side surface 122 of the second lens element 120 is Dr1r4, the axial distance between the object-side surface 131 of the third lens element 130 and the image-side surface 162 of the sixth lens element 160 is Dr5r12, and they satisfy the condition: Dr1r4/Dr5r12=1.43.

In the 1st embodiment, an axial distance between the first lens element 110 and the second lens element 120 is T12, a central thickness of the first lens element 110 is CT1, and they satisfy the condition: T12/CT1=3.00.

In the 1st embodiment, an axial distance between the fifth lens element 150 and the sixth lens element 160 is T56, a central thickness of the sixth lens element 160 is CT6, and they satisfy the condition: T56/CT6=2.95.

In the 1st embodiment, an axial distance between the third lens element 130 and the fourth lens element 140 is T34, an axial distance between the fourth lens element 140 and the fifth lens element 150 is T45, the axial distance between the fifth lens element 150 and the sixth lens element 160 is T56, and they satisfy the condition:
T56/(T34+T45)=7.55.

In the 1st embodiment, the axial distance between the fifth lens element 150 and the sixth lens element 160 is T56, the displacement in parallel with the optical axis from the axial vertex on the image-side surface 152 of the fifth lens element 150 to the maximum effective diameter position on the image-side surface 152 of the fifth lens element 150 is SAG52, the displacement in parallel with the optical axis from the axial vertex on the object-side surface 161 of the sixth lens element 160 to the maximum effective diameter position on the object-side surface 161 of the sixth lens element 160 is SAG61, and they satisfy the condition: (T56−SAG52+SAG61)/T56=0.14.

In the 1st embodiment, a curvature radius of the object-side surface 111 of the first lens element 110 is R1, a curvature radius of the image-side surface 132 of the third lens element 130 is R6, and they satisfy the condition: R1/R6=2.61.

In the 1st embodiment, a curvature radius of the object-side surface 131 of the third lens element 130 is R5, the curvature radius of the image-side surface 132 of the third lens element 130 is R6, and they satisfy the condition: R6/|R5|=0.37.

In the 1st embodiment, a curvature radius of the image-side surface 162 of the sixth lens element 160 is R12, the focal length of the optical image capturing lens assembly is f, and they satisfy the condition: R12/f=0.63.

In the 1st embodiment, a focal length of the second lens element 120 is f2, a focal length of the fourth lens element 140 is f4, and they satisfy the condition: f2/f4=1.65.

In the 1st embodiment, a focal length of the fifth lens element 150 is f5, a focal length of the sixth lens element 160 is f6, and they satisfy the condition: |f6/f5|=0.41.

In the 1st embodiment, the vertical distance between the maximum effective diameter position on the object-side surface 111 of the first lens element 110 and the optical axis is Y11, the vertical distance between the at least one critical point closet to the optical axis in the off-axis region of the image-side surface 162 of the sixth lens element 160 and the optical axis is Yc62, and they satisfy the condition: Yc62/Y11=0.36.

2nd Embodiment

Figure 2A:
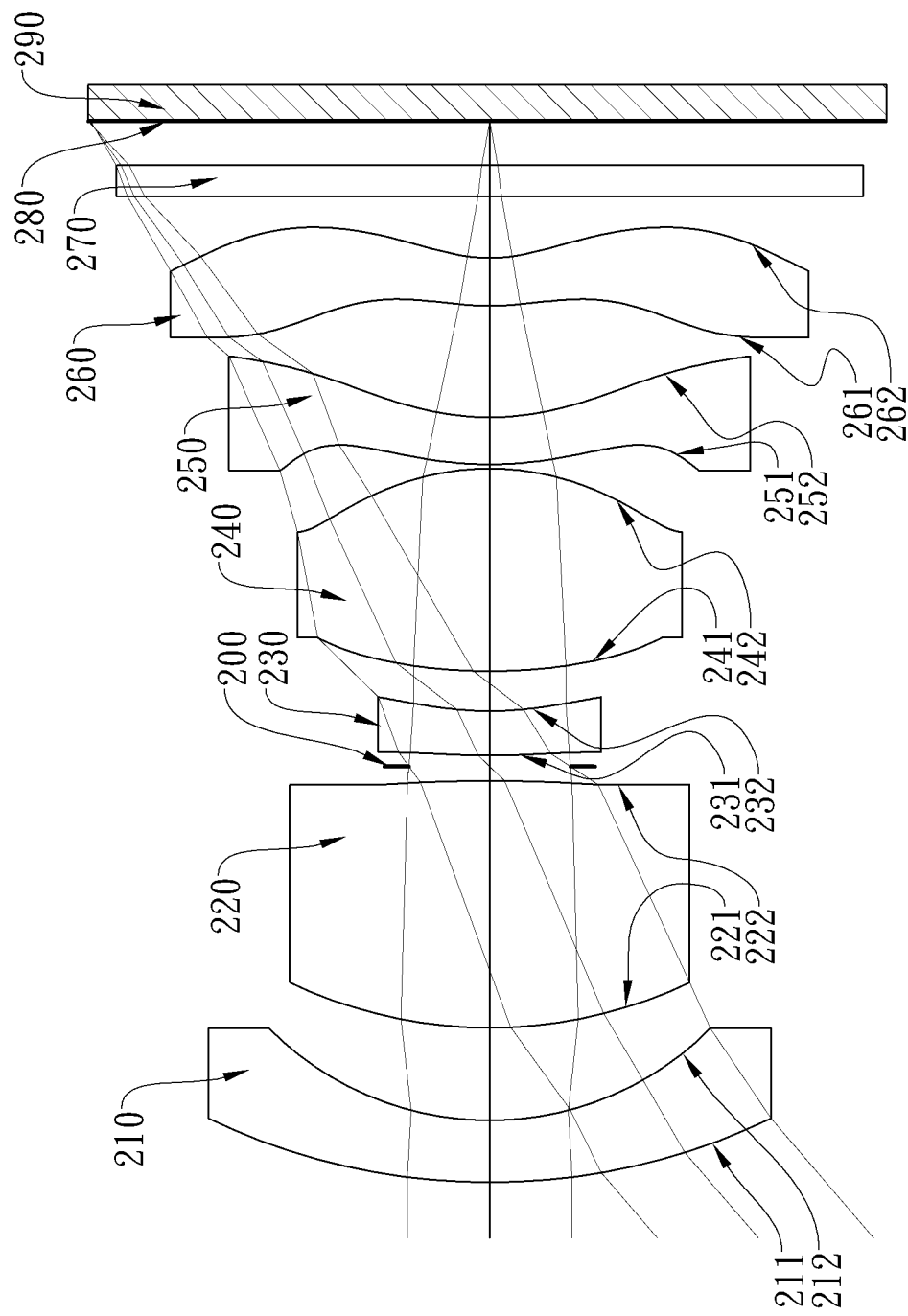
FIG. 2A is a schematic view of an imaging apparatus according to the 2nd embodiment of the present disclosure.
Figure 2B:
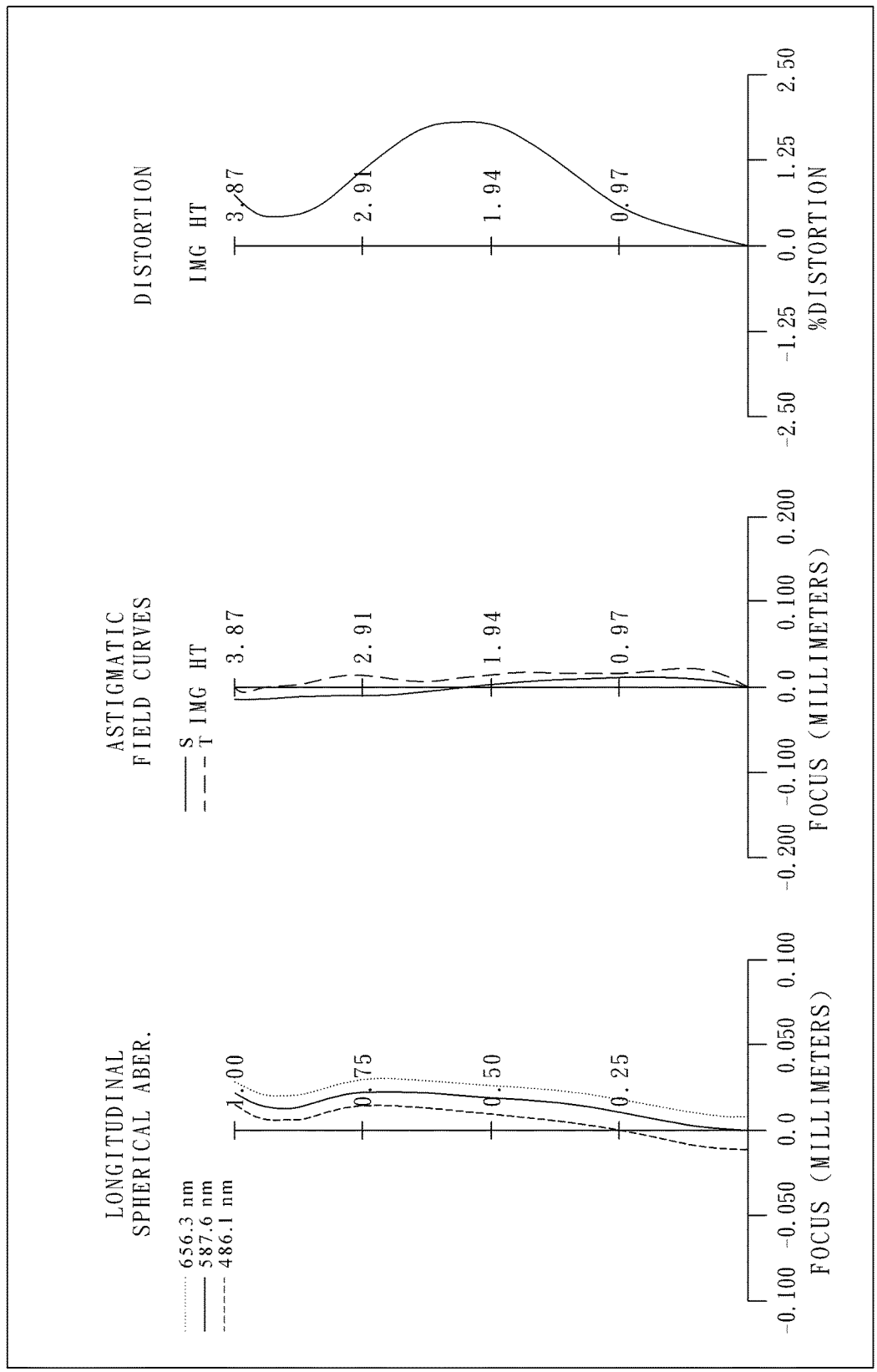
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an optical image capturing lens assembly (not otherwise herein labeled) of the present disclosure and an image sensor 290. The optical image capturing lens assembly includes, in order from an object side to an image side, a first lens element 210, a second lens element 220, an aperture stop 200, a third lens element 230, a fourth lens element 240, a fifth lens element 250 and a sixth lens element 260, wherein the optical image capturing lens assembly includes six lens elements (210, 220, 230, 240, 250, and 260) with no additional lens element disposed between the first lens element 210 and the sixth lens element 260.

The first lens element 210 with negative refractive power has an object-side surface 211 being convex in a paraxial region thereof and an image-side surface 212 being concave in a paraxial region thereof, and the first lens element 210 is made of glass.

The second lens element 220 with positive refractive power has an object-side surface 221 being convex in a paraxial region thereof and an image-side surface 222 being convex in a paraxial region thereof, and the second lens element 220 is made of glass.

The third lens element 230 with negative refractive power has an object-side surface 231 being convex in a paraxial region thereof and an image-side surface 232 being concave in a paraxial region thereof, which are both aspheric, and the third lens element 230 is made of plastic.

The fourth lens element 240 with positive refractive power has an object-side surface 241 being convex in a paraxial region thereof and an image-side surface 242 being convex in a paraxial region thereof, which are both aspheric, and the fourth lens element 240 is made of plastic.

The fifth lens element 250 with negative refractive power has an object-side surface 251 being convex in a paraxial region thereof and an image-side surface 252 being concave in a paraxial region thereof, which are both aspheric, and the fifth lens element 250 is made of plastic. Moreover, the object-side surface 251 has at least one critical point in an off-axis region thereof.

The sixth lens element 260 with negative refractive power has an object-side surface 261 being convex in a paraxial region thereof and an image-side surface 262 being concave in a paraxial region thereof, which are both aspheric, and the sixth lens element 260 is made of plastic. Moreover, the image-side surface 262 has at least one critical point including at least one convex critical point in an off-axis region thereof.

An IR-cut filter 270 is located between the sixth lens element 260 and an image surface 280. The IR-cut filter 270 is made of glass and it does not affect the focal length of the optical image capturing lens assembly. The image sensor 290 is disposed on or near the image surface 280 of the optical image capturing lens assembly.

The detailed optical data of the 2nd embodiment are shown in TABLE 3, and the aspheric surface data of the 2nd embodiment are shown in TABLE 4, wherein the units of the curvature radius, the thickness and the focal length are expressed in mm, and HFOV is defined as half of the maximum field of view.

TABLE 3

(2nd Embodiment)
f = 4.46 mm, Fno = 2.80, HFOV = 40.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.302 | | 0.600 | Glass | 1.804 | 46.5 | −7.76 |
| 2 | | 3.003 | | 0.899 | | | | |
| 3 | Lens 2 | 4.508 | | 2.394 | Glass | 1.804 | 46.5 | 4.53 |
| 4 | | −14.529 | | 0.138 | | | | |
| 5 | Ape. Stop | Plano | | 0.106 | | | | |
| 6 | Lens 3 | 7.067 | ASP | 0.430 | Plastic | 1.660 | 20.4 | −8.46 |
| 7 | | 3.044 | ASP | 0.387 | | | | |
| 8 | Lens 4 | 5.150 | ASP | 1.965 | Plastic | 1.544 | 56.0 | 3.44 |
| 9 | | −2.548 | ASP | 0.040 | | | | |
| 10 | Lens 5 | 3.309 | ASP | 0.456 | Plastic | 1.584 | 28.2 | −21.39 |
| 11 | | 2.483 | ASP | 1.082 | | | | |
| 12 | Lens 6 | 2.510 | ASP | 0.462 | Plastic | 1.584 | 28.2 | −6.11 |
| 13 | | 1.374 | ASP | 0.600 | | | | |
| 14 | IR-cut filter | Plano | | 0.300 | Glass | 1.517 | 64.2 | — |
| 15 | | Plano | | 0.425 | | | | |
| 16 | Image surface | Plano | | — | | | | |

Note:
Reference wavelength is d-line 587.6 nm

TABLE 4

| Aspheric Coefficients | | | | |
|---|---|---|---|---|
| Surface # | 6 | 7 | 8 | 9 |
| k = | 4.1530E+01 | −2.8042E+00 | −3.9572E+01 | −1.0739E+00 |
| A4 = | −7.0869E−02 | −4.5496E−02 | 3.5405E−02 | −1.5137E−02 |
| A6 = | 6.2889E−02 | 2.8957E−02 | −1.8067E−02 | 3.0012E−02 |
| A8 = | −2.5720E−01 | −5.4734E−02 | 7.3103E−03 | −3.4676E−02 |
| A10 = | 5.3637E−01 | 8.4714E−02 | −4.8275E−04 | 2.1955E−02 |
| A12 = | −5.5513E−01 | −6.4204E−02 | −4.0109E−04 | −8.0162E−03 |
| A14 = | 2.1301E−01 | 1.7563E−02 | 9.7436E−05 | 1.5886E−03 |
| A16 = | | | −6.2922E−06 | −1.2654E−04 |
| Surface # | 10 | 11 | 12 | 13 |
| k = | −1.9862E+01 | −1.6725E+00 | −2.3069E+01 | −6.5311E+00 |
| A4 = | 2.5890E−02 | −2.6194E−02 | −7.7868E−02 | −4.2501E−02 |
| A6 = | −1.3110E−02 | 2.0749E−02 | 1.0657E−02 | 8.0442E−03 |
| A8 = | −2.1475E−03 | −1.2982E−02 | 1.0907E−03 | −9.3740E−04 |
| A10 = | 1.9860E−03 | 3.9016E−03 | −3.2962E−04 | 3.7997E−05 |
| A12 = | −7.9384E−04 | −6.1488E−04 | 2.0204E−05 | 2.3619E−06 |
| A14 = | 1.5108E−04 | 4.9570E−05 | 1.9218E−07 | −2.1076E−07 |
| A16 = | −9.7326E−06 | −1.6171E−06 | −3.8682E−08 | 2.4072E−09 |

In the 2nd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 2nd embodiment are as specified below.

| 2nd Embodiment | | | |
|---|---|---|---|
| f [mm] | 4.46 | T56/CT6 | 2.34 |
| Fno | 2.80 | T56/(T34 + T45) | 2.53 |
| HFOV [deg.] | 40.6 | (T56 − SAG52 + SAG61)/T56 | 0.17 |
| V3 | 20.4 | R1/R6 | 2.07 |
| V3 + V4 | 76.4 | R6/|R5| | 0.43 |
| V5 | 28.2 | R12/f | 0.31 |
| V6 | 28.2 | f2/f4 | 1.32 |
| Dr1r4/Dr5r12 | 0.81 | |f6/f5| | 0.29 |
| T12/CT1 | 1.50 | Yc62/Y11 | 0.62 |

3rd Embodiment

Figure 3A:
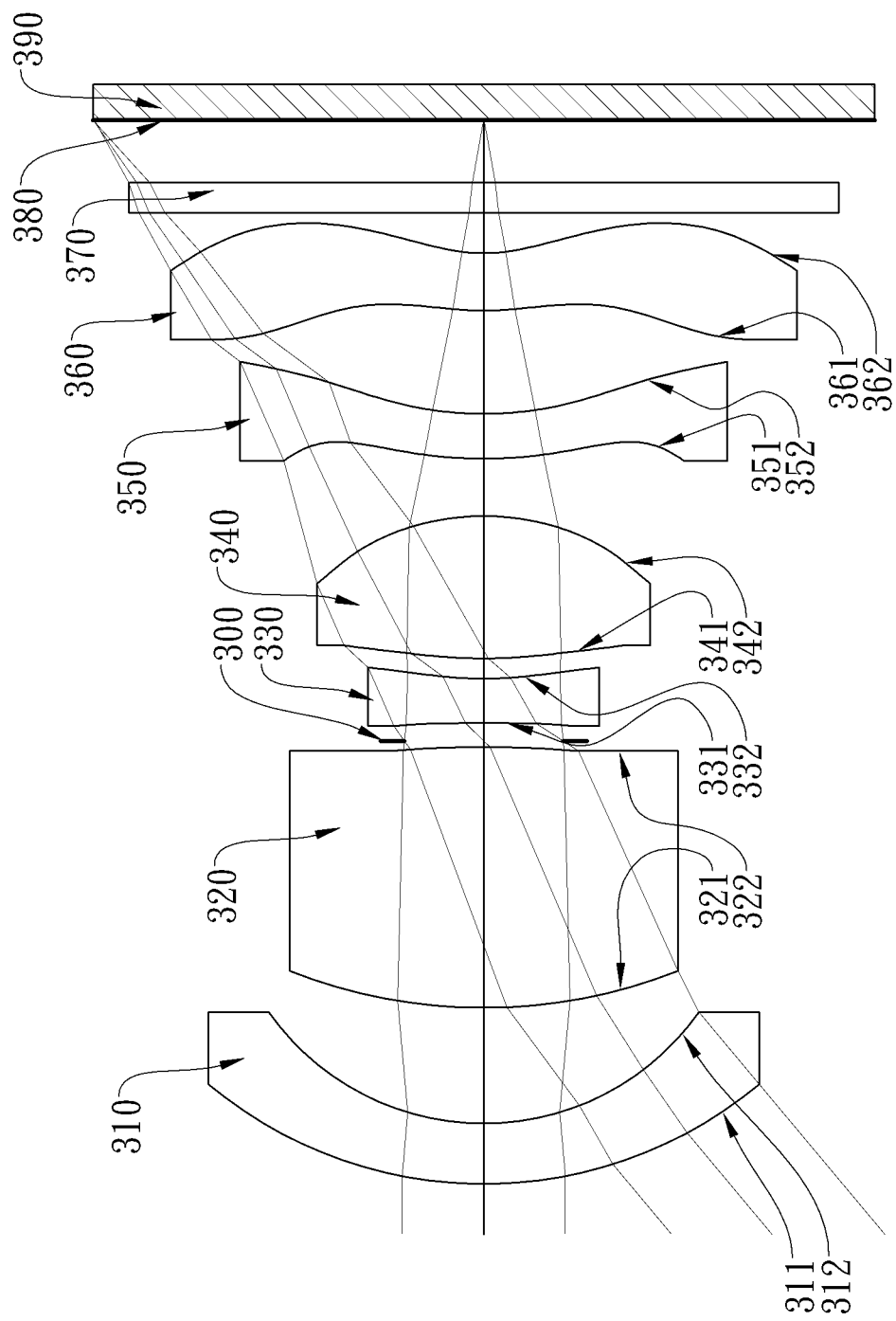
FIG. 3A is a schematic view of an imaging apparatus according to the 3rd embodiment of the present disclosure.
Figure 3B:
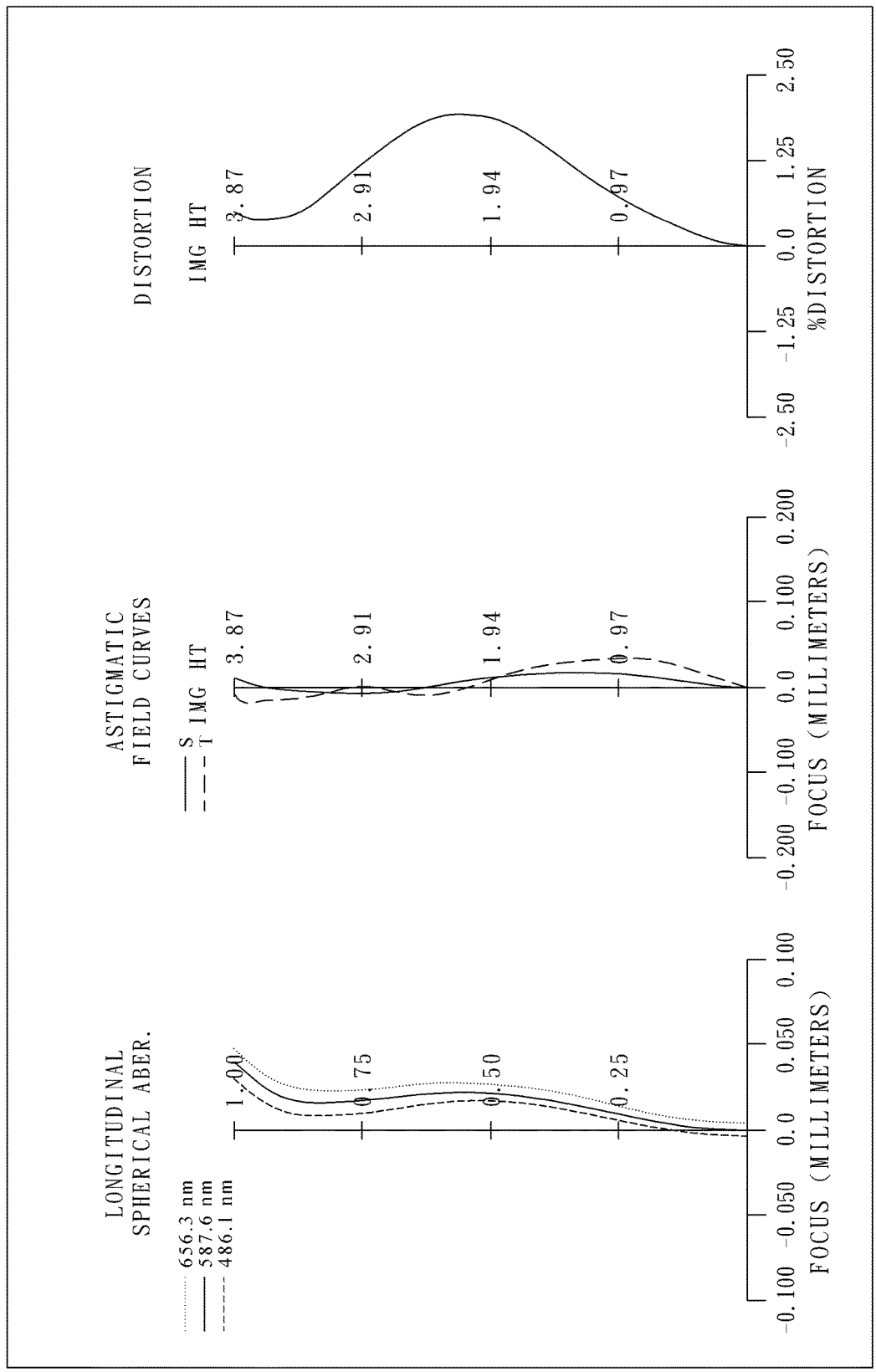
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an optical image capturing lens assembly (not otherwise herein labeled) of the present disclosure and an image sensor 390. The optical image capturing lens assembly includes, in order from an object side to an image side, a first lens element 310, a second lens element 320, an aperture stop 300, a third lens element 330, a fourth lens element 340, a fifth lens element 350 and a sixth lens element 360, wherein the optical image capturing lens assembly includes six lens elements (310, 320, 330, 340, 350, and 360) with no additional lens element disposed between the first lens element 310 and the sixth lens element 360.

The first lens element 310 with negative refractive power has an object-side surface 311 being convex in a paraxial region thereof and an image-side surface 312 being concave in a paraxial region thereof, and the first lens element 310 is made of glass.

The second lens element 320 with positive refractive power has an object-side surface 321 being convex in a paraxial region thereof and an image-side surface 322 being convex in a paraxial region thereof, and the second lens element 320 is made of glass.

The third lens element 330 with negative refractive power has an object-side surface 331 being concave in a paraxial region thereof and an image-side surface 332 being concave in a paraxial region thereof, which are both aspheric, and the third lens element 330 is made of plastic.

The fourth lens element 340 with positive refractive power has an object-side surface 341 being convex in a paraxial region thereof and an image-side surface 342 being convex in a paraxial region thereof, which are both aspheric, and the fourth lens element 340 is made of plastic.

The fifth lens element 350 with negative refractive power has an object-side surface 351 being convex in a paraxial region thereof and an image-side surface 352 being concave in a paraxial region thereof, which are both aspheric, and the fifth lens element 350 is made of plastic. Moreover, the object-side surface 351 has at least one critical point in an off-axis region thereof.

The sixth lens element 360 with negative refractive power has an object-side surface 361 being convex in a paraxial region thereof and an image-side surface 362 being concave in a paraxial region thereof, which are both aspheric, and the sixth lens element 360 is made of plastic. Moreover, the image-side surface 362 has at least one critical point including at least one convex critical point in an off-axis region thereof.

An IR-cut filter 370 is located between the sixth lens element 360 and an image surface 380. The IR-cut filter 370 is made of glass and it does not affect the focal length of the optical image capturing lens assembly. The image sensor 390 is disposed on or near the image surface 380 of the optical image capturing lens assembly.

The detailed optical data of the 3rd embodiment are shown in TABLE 5, and the aspheric surface data of the 3rd embodiment are shown in TABLE 6, wherein the units of the curvature radius, the thickness and the focal length are expressed in mm, and HFOV is defined as half of the maximum field of view.

TABLE 5

(3rd Embodiment)
f = 4.58 mm, Fno = 2.83, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.270 | | 0.600 | Glass | 1.834 | 37.2 | −9.67 |
| 2 | | 2.614 | | 1.150 | | | | |
| 3 | Lens 2 | 5.273 | | 2.590 | Glass | 1.806 | 40.9 | 4.78 |
| 4 | | −11.157 | | 0.059 | | | | |
| 5 | Ape. Stop | Plano | | 0.176 | | | | |
| 6 | Lens 3 | −200.000 | ASP | 0.442 | Plastic | 1.639 | 23.5 | −5.14 |
| 7 | | 3.339 | ASP | 0.201 | | | | |
| 8 | Lens 4 | 4.521 | ASP | 1.414 | Plastic | 1.544 | 56.0 | 3.17 |
| 9 | | −2.480 | ASP | 0.571 | | | | |
| 10 | Lens 5 | 4.503 | ASP | 0.445 | Plastic | 1.584 | 28.2 | −32.09 |
| 11 | | 3.498 | ASP | 1.026 | | | | |
| 12 | Lens 6 | 2.934 | ASP | 0.569 | Plastic | 1.584 | 28.2 | −6.97 |
| 13 | | 1.583 | ASP | 0.400 | | | | |
| 14 | IR-cut filter | Plano | | 0.300 | Glass | 1.517 | 64.2 | — |
| 15 | | Plano | | 0.621 | | | | |
| 16 | Image surface | Plano | | — | | | | |

Note:
Reference wavelength is d-line 587.6 nm

TABLE 6

Aspheric Coefficients

| Surface # | 6 | 7 | 8 | 9 |
|---|---|---|---|---|
| k = | −3.9071E−03 | −2.6283E+00 | −3.7997E+01 | −4.4433E−01 |
| A4 = | −6.2363E−02 | −8.0360E−02 | 1.5153E−02 | 6.5615E−02 |
| A6 = | 3.7339E−02 | 5.0712E−02 | −2.5386E−02 | −2.3283E−02 |
| A8 = | −1.9988E−02 | −3.0010E−02 | 9.5002E−03 | 1.7807E−02 |
| A10 = | −2.7777E−04 | 1.4543E−02 | 6.2996E−04 | −9.4058E−03 |
| A12 = | | −3.9974E−03 | −5.4260E−04 | 2.4165E−03 |
| A14 = | | | | −1.9378E−04 |

| Surface # | 10 | 11 | 12 | 13 |
|---|---|---|---|---|
| k = | −1.9438E+01 | −8.5728E−01 | −2.1181E+01 | −6.1410E+00 |
| A4 = | 3.4341E−02 | 5.7851E−04 | −7.0368E−02 | −4.1768E−02 |
| A6 = | −2.4204E−02 | 8.9602E−03 | 1.2061E−02 | 9.7815E−03 |
| A8 = | 6.8354E−03 | −1.1253E−02 | −4.0426E−04 | −1.8704E−03 |
| A10 = | −2.7630E−03 | 4.1675E−03 | −4.7081E−05 | 2.4520E−04 |
| A12 = | 6.4894E−04 | −7.4277E−04 | 2.2425E−06 | −2.1263E−05 |
| A14 = | −5.4705E−05 | 6.6088E−05 | 7.0375E−08 | 1.1054E−06 |
| A16 = | | −2.3654E−06 | | −2.5432E−08 |

In the 3rd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 3rd embodiment are as specified below.

| 3rd Embodiment | | | |
|---|---|---|---|
| f [mm] | 4.58 | T56/CT6 | 1.80 |
| Fno | 2.83 | T56/(T34 + T45) | 1.33 |
| HFOV [deg.] | 40.0 | (T56 − SAG52 + SAG61)/T56 | 0.21 |
| V3 | 23.5 | R1/R6 | 1.28 |
| V3 + V4 | 79.5 | R6/|R5| | 0.02 |
| V5 | 28.2 | R12/f | 0.35 |
| V6 | 28.2 | f2/f4 | 1.51 |
| Dr1r4/Dr5r12 | 0.93 | |f6/f5| | 0.22 |
| T12/CT1 | 1.92 | Yc62/Y11 | 0.64 |

4th Embodiment

Figure 4A:
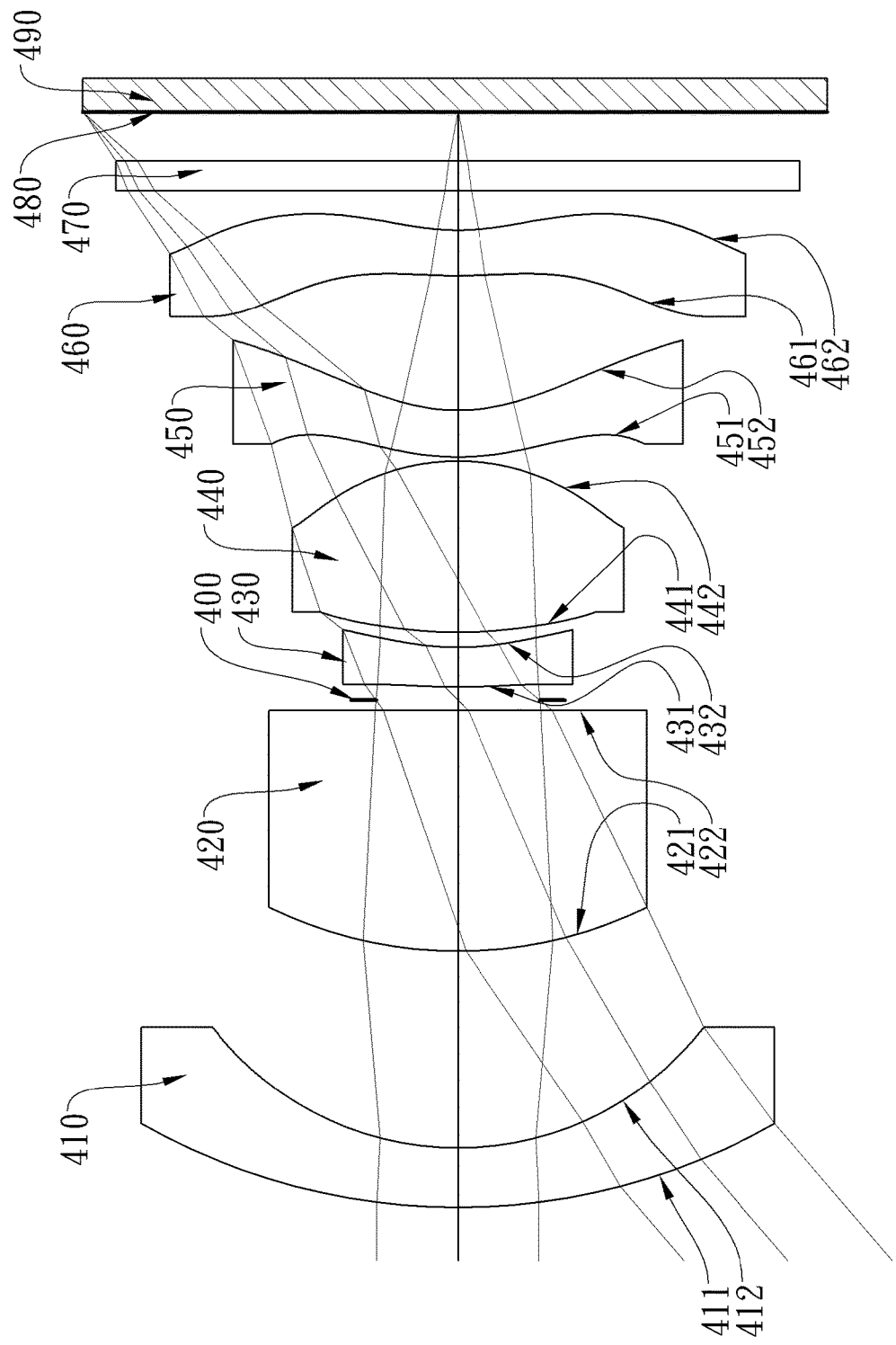
FIG. 4A is a schematic view of an imaging apparatus according to the 4th embodiment of the present disclosure.
Figure 4B:
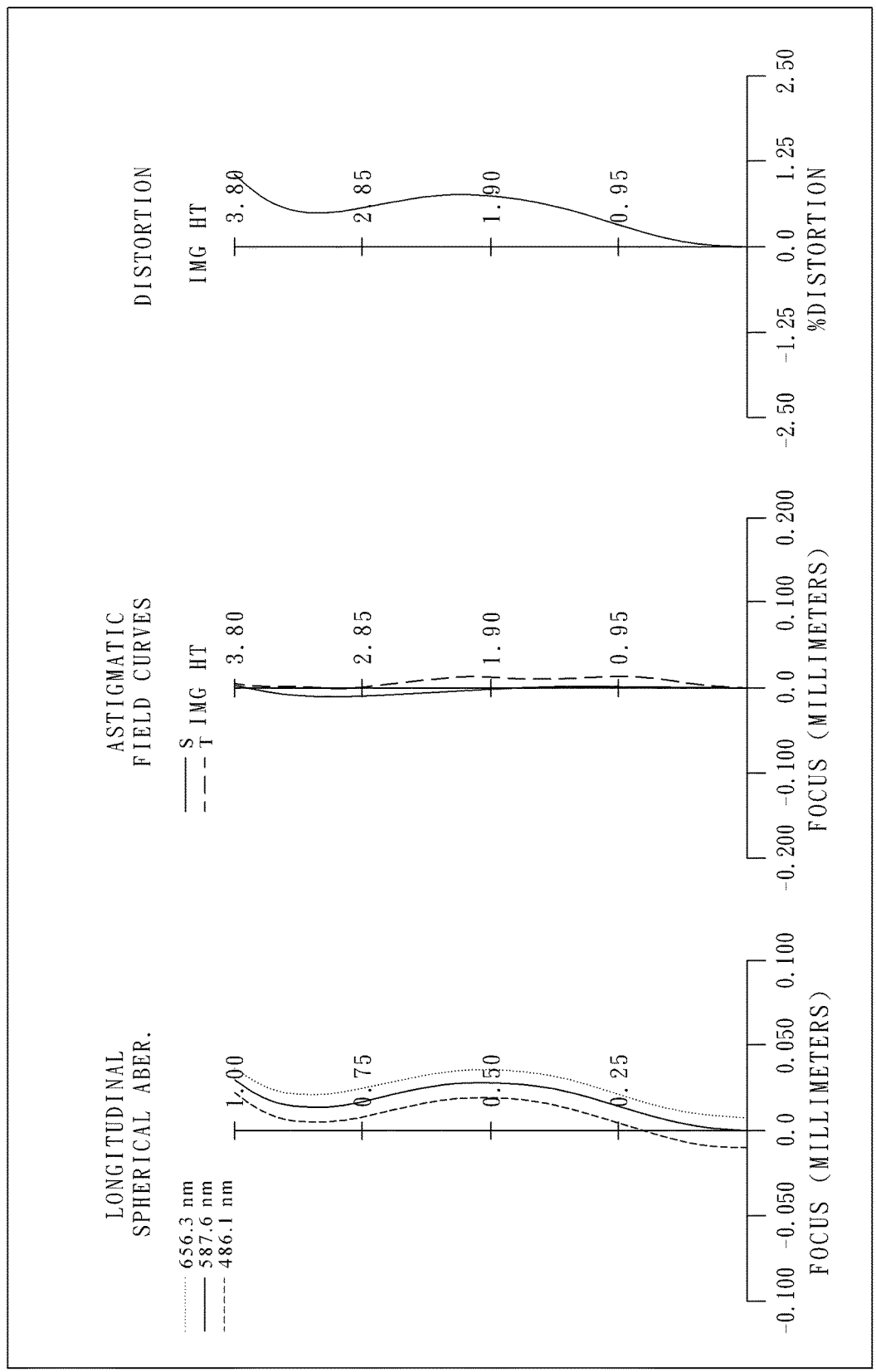
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an optical image capturing lens assembly (not otherwise herein labeled) of the present disclosure and an image sensor 490. The optical image capturing lens assembly includes, in order from an object side to an image side, a first lens element 410, a second lens element 420, an aperture stop 400, a third lens element 430, a fourth lens element 440, a fifth lens element 450 and a sixth lens element 460, wherein the optical image capturing lens assembly includes six lens elements (410, 420, 430, 440, 450, and 460) with no additional lens element disposed between the first lens element 410 and the sixth lens element 460.

The first lens element 410 with negative refractive power has an object-side surface 411 being convex in a paraxial region thereof and an image-side surface 412 being concave in a paraxial region thereof, and the first lens element 410 is made of glass.

The second lens element 420 with positive refractive power has an object-side surface 421 being convex in a paraxial region thereof and an image-side surface 422 being concave in a paraxial region thereof, and the second lens element 420 is made of glass.

The third lens element 430 with negative refractive power has an object-side surface 431 being convex in a paraxial region thereof and an image-side surface 432 being concave in a paraxial region thereof, which are both aspheric, and the third lens element 430 is made of plastic.

The fourth lens element 440 with positive refractive power has an object-side surface 441 being convex in a paraxial region thereof and an image-side surface 442 being convex in a paraxial region thereof, which are both aspheric, and the fourth lens element 440 is made of plastic.

The fifth lens element 450 with negative refractive power has an object-side surface 451 being convex in a paraxial region thereof and an image-side surface 452 being concave in a paraxial region thereof, which are both aspheric, and the fifth lens element 450 is made of plastic. Moreover, the object-side surface 451 has at least one critical point in an off-axis region thereof.

The sixth lens element 460 with negative refractive power has an object-side surface 461 being convex in a paraxial region thereof and an image-side surface 462 being concave in a paraxial region thereof, which are both aspheric, and the sixth lens element 460 is made of plastic. Moreover, the image-side surface 462 has at least one critical point including at least one convex critical point in an off-axis region thereof.

An IR-cut filter 470 is located between the sixth lens element 460 and an image surface 480. The IR-cut filter 470 is made of glass and it does not affect the focal length of the optical image capturing lens assembly. The image sensor 490 is disposed on or near the image surface 480 of the optical image capturing lens assembly.

The detailed optical data of the 4th embodiment are shown in TABLE 7, and the aspheric surface data of the 4th embodiment are shown in TABLE 8, wherein the units of the curvature radius, the thickness and the focal length are expressed in mm, and HFOV is defined as half of the maximum field of view.

TABLE 7

(4th Embodiment)
f = 4.36 mm, Fno = 2.65, HFOV = 40.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.500 | | 0.600 | Glass | 1.639 | 44.9 | −10.20 |
| 2 | | 3.138 | | 1.998 | | | | |
| 3 | Lens 2 | 4.360 | | 2.437 | Glass | 1.788 | 47.4 | 5.63 |
| 4 | | 196.078 | | 0.107 | | | | |
| 5 | Ape. Stop | Plano | | 0.134 | | | | |
| 6 | Lens 3 | 6.614 | ASP | 0.400 | Plastic | 1.642 | 22.5 | −6.83 |
| 7 | | 2.574 | ASP | 0.152 | | | | |
| 8 | Lens 4 | 4.310 | ASP | 1.741 | Plastic | 1.534 | 55.9 | 3.06 |
| 9 | | −2.264 | ASP | 0.040 | | | | |
| 10 | Lens 5 | 2.577 | ASP | 0.472 | Plastic | 1.582 | 30.2 | −16.58 |
| 11 | | 1.897 | ASP | 1.369 | | | | |
| 12 | Lens 6 | 5.642 | ASP | 0.460 | Plastic | 1.614 | 26.0 | −6.50 |
| 13 | | 2.264 | ASP | 0.400 | | | | |
| 14 | IR-cut filter | Plano | | 0.300 | Glass | 1.517 | 64.2 | — |
| 15 | | Plano | | 0.494 | | | | |
| 16 | Image surface | Plano | | — | | | | |

Note:
Reference wavelength is d-line 587.6 nm

TABLE 8

Aspheric Coefficients

| | Surface # | | | |
|---|---|---|---|---|
| | 6 | 7 | 8 | 9 |
| k = | −4.7935E+01 | −1.4256E+00 | −4.0853E+01 | −6.9930E−01 |
| A4 = | −4.8062E−02 | −7.4393E−02 | 4.1473E−02 | −1.2021E−02 |
| A6 = | 2.4774E−02 | 3.0634E−02 | −4.9128E−02 | 4.0211E−03 |
| A8 = | −1.4573E−02 | −1.1959E−03 | 3.6761E−02 | −3.0148E−03 |
| A10 = | | −4.6551E−03 | −1.2082E−02 | 1.5656E−03 |
| A12 = | | 8.6768E−04 | 1.5380E−03 | −6.1363E−04 |
| A14 = | | | | 1.4056E−04 |

| | Surface # | | | |
|---|---|---|---|---|
| | 10 | 11 | 12 | 13 |
| k = | −9.6228E+00 | −1.8057E+00 | −6.3417E+00 | −7.9430E+00 |
| A4 = | 2.1352E−02 | −1.6748E−02 | −1.0780E−01 | −5.6928E−02 |
| A6 = | −3.2636E−02 | −4.1751E−03 | 3.6858E−02 | 1.7816E−02 |

TABLE 8-continued

| Aspheric Coefficients | | | | |
|---|---|---|---|---|
| A8 = | 1.4766E−02 | 2.4917E−03 | −9.7559E−03 | −4.3534E−03 |
| A10 = | −4.8618E−03 | −6.4727E−04 | 1.9556E−03 | 7.2040E−04 |
| A12 = | 9.1670E−04 | 1.1042E−04 | −2.3786E−04 | −7.5227E−05 |
| A14 = | −7.3857E−05 | −1.1392E−05 | 1.5234E−05 | 4.4445E−06 |
| A16 = | | 5.0632E−07 | −3.9572E−07 | −1.1047E−07 |

In the 4th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 4th embodiment are as specified below.

| 4th Embodiment | | | |
|---|---|---|---|
| f [mm] | 4.36 | T56/CT6 | 2.98 |
| Fno | 2.65 | T56/(T34 + T45) | 7.13 |
| HFOV [deg.] | 40.7 | (T56 − SAG52 + SAG61)/T56 | 0.18 |
| V3 | 22.5 | R1/R6 | 2.52 |
| V3 + V4 | 78.4 | R6/|R5| | 0.39 |
| V5 | 30.2 | R12/f | 0.52 |
| V6 | 26.0 | f2/f4 | 1.84 |
| Dr1r4/Dr5r12 | 1.09 | |f6/f5| | 0.39 |
| T12/CT1 | 3.33 | Yc62/Y11 | 0.46 |

5th Embodiment

Figure 5A:
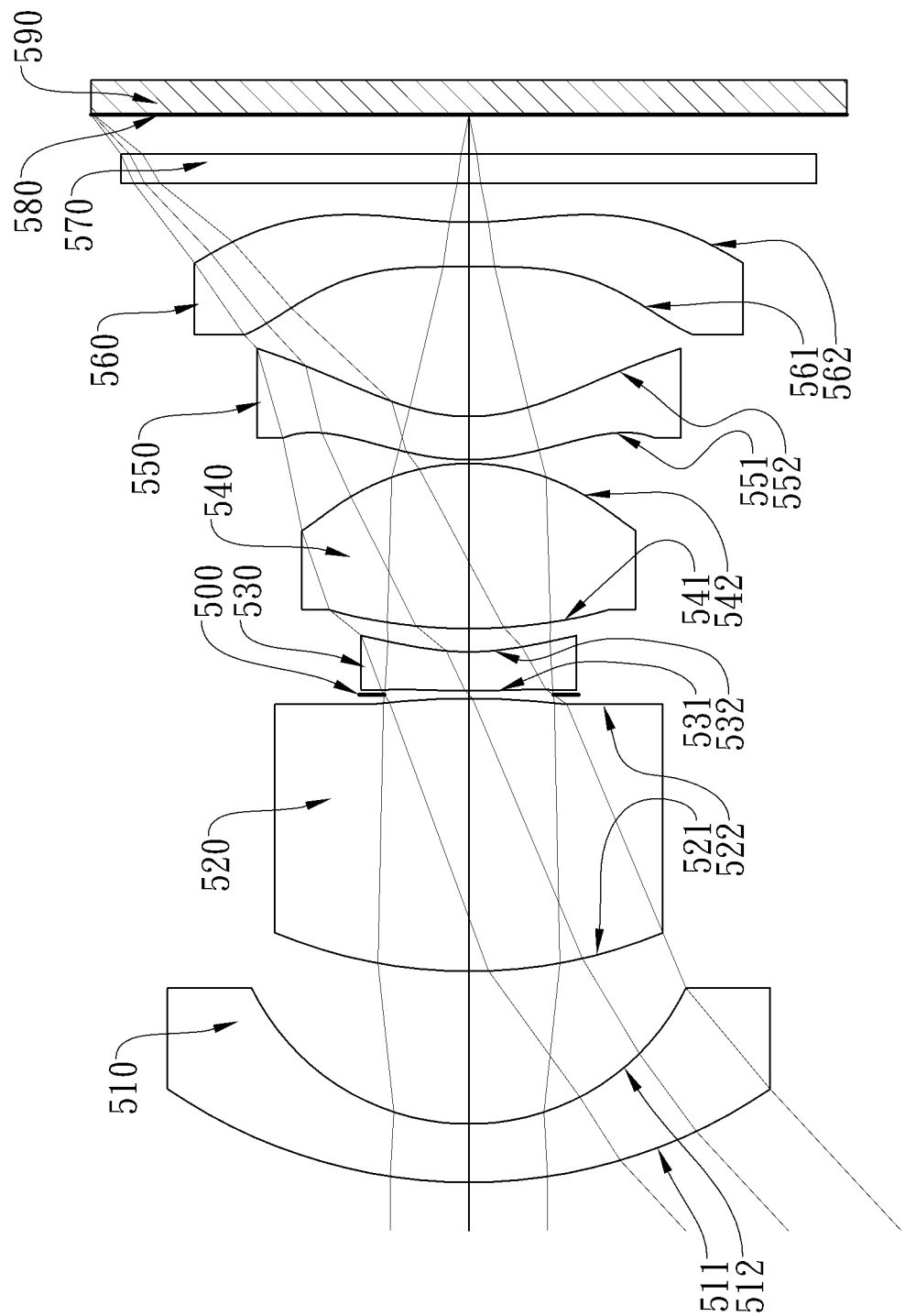
FIG. 5A is a schematic view of an imaging apparatus according to the 5th embodiment of the present disclosure.
Figure 5B:
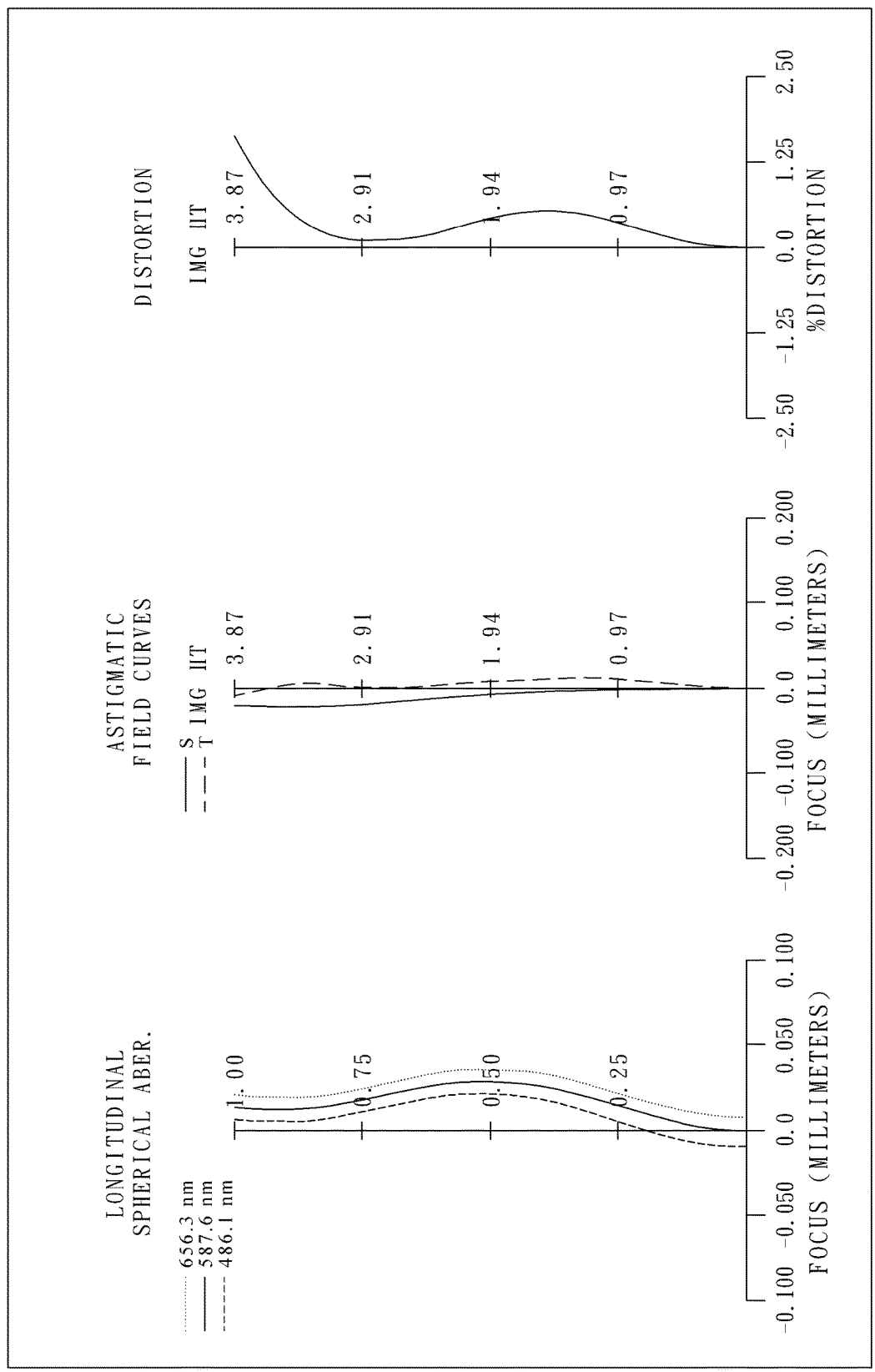
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an optical image capturing lens assembly (not otherwise herein labeled) of the present disclosure and an image sensor 590. The optical image capturing lens assembly includes, in order from an object side to an image side, a first lens element 510, a second lens element 520, an aperture stop 500, a third lens element 530, a fourth lens element 540, a fifth lens element 550 and a sixth lens element 560, wherein the optical image capturing lens assembly includes six lens elements (510, 520, 530, 540, 550, and 560) with no additional lens element disposed between the first lens element 510 and the sixth lens element 560.

The first lens element 510 with negative refractive power has an object-side surface 511 being convex in a paraxial region thereof and an image-side surface 512 being concave in a paraxial region thereof, and the first lens element 510 is made of glass.

The second lens element 520 with positive refractive power has an object-side surface 521 being convex in a paraxial region thereof and an image-side surface 522 being convex in a paraxial region thereof, and the second lens element 520 is made of glass.

The third lens element 530 with negative refractive power has an object-side surface 531 being convex in a paraxial region thereof and an image-side surface 532 being concave in a paraxial region thereof, which are both aspheric, and the third lens element 530 is made of plastic.

The fourth lens element 540 with positive refractive power has an object-side surface 541 being convex in a paraxial region thereof and an image-side surface 542 being convex in a paraxial region thereof, which are both aspheric, and the fourth lens element 540 is made of plastic.

The fifth lens element 550 with negative refractive power has an object-side surface 551 being convex in a paraxial region thereof and an image-side surface 552 being concave in a paraxial region thereof, which are both aspheric, and the fifth lens element 550 is made of plastic. Moreover, the object-side surface 551 has at least one critical point in an off-axis region thereof.

The sixth lens element 560 with negative refractive power has an object-side surface 561 being concave in a paraxial region thereof and an image-side surface 562 being concave in a paraxial region thereof, which are both aspheric, and the sixth lens element 560 is made of plastic. Moreover, the image-side surface 562 has at least one critical point including at least one convex critical point in an off-axis region thereof.

An IR-cut filter 570 is located between the sixth lens element 560 and an image surface 580. The IR-cut filter 570 is made of glass and it does not affect the focal length of the optical image capturing lens assembly. The image sensor 590 is disposed on or near the image surface 580 of the optical image capturing lens assembly.

The detailed optical data of the 5th embodiment are shown in TABLE 9, and the aspheric surface data of the 5th embodiment are shown in TABLE 10, wherein the units of the curvature radius, the thickness and the focal length are expressed in mm, and HFOV is defined as half of the maximum field of view.

TABLE 9

| (5th Embodiment) f = 4.09 mm, Fno = 2.53, HFOV = 42.8 deg. | | | | | | | |
|---|---|---|---|---|---|---|---|
| Surface # | | | Curvature Radius | Thickness | Material | Index | Abbe # | Focal Length |
| 0 | Object | | Plano | Infinity | | | | |
| 1 | Lens 1 | | 5.486 | 0.600 | Glass | 1.589 | 61.3 | −8.32 |
| 2 | | | 2.484 | 1.572 | | | | |
| 3 | Lens 2 | | 5.220 | 2.810 | Glass | 1.788 | 47.5 | 4.51 |
| 4 | | | −8.498 | 0.038 | | | | |

TABLE 9-continued (5th Embodiment)
f = 4.09 mm, Fno = 2.53, HFOV = 42.8 deg.

| Surface # | | Curvature Radius | | Thickness | Material | Index | Abbe # | Focal Length |
|---|---|---|---|---|---|---|---|---|
| 5 | Ape. Stop | Plano | | 0.040 | | | | |
| 6 | Lens 3 | 8.842 | ASP | 0.401 | Plastic | 1.642 | 22.5 | −5.66 |
| 7 | | 2.527 | ASP | 0.239 | | | | |
| 8 | Lens 4 | 5.166 | ASP | 1.701 | Plastic | 1.544 | 56.0 | 3.14 |
| 9 | | −2.261 | ASP | 0.040 | | | | |
| 10 | Lens 5 | 2.394 | ASP | 0.445 | Plastic | 1.566 | 37.4 | −20.23 |
| 11 | | 1.847 | ASP | 1.541 | | | | |
| 12 | Lens 6 | −178.571 | ASP | 0.460 | Plastic | 1.614 | 26.0 | −6.36 |
| 13 | | 3.993 | ASP | 0.400 | | | | |
| 14 | IR-cut filter | Plano | | 0.300 | Glass | 1.517 | 64.2 | — |
| 15 | | Plano | | 0.407 | | | | |
| 16 | Image surface | Plano | | — | | | | |

Note:
Reference wavelength is d-line 587.6 nm

TABLE 10

Aspheric Coefficients

| Surface # | | | | |
|---|---|---|---|---|
| | 6 | 7 | 8 | 9 |
| k = | −4.9573E+01 | −1.4436E+00 | −4.1395E+01 | −7.8579E−01 |
| A4 = | −6.6354E−02 | −6.7866E−02 | 3.9213E−02 | 8.8971E−04 |
| A6 = | 2.7800E−02 | 5.8504E−03 | −3.8969E−02 | −7.8166E−03 |
| A8 = | −8.9884E−03 | 3.0653E−02 | 2.3461E−02 | 5.4549E−03 |
| A10 = | | −2.4379E−02 | −6.3476E−03 | −2.5857E−03 |
| A12 = | | 6.1145E−03 | 6.8590E−04 | 5.9483E−04 |
| A14 = | | | | −2.7000E−05 |

| Surface # | | | | |
|---|---|---|---|---|
| | 10 | 11 | 12 | 13 |
| k = | −4.3884E+00 | −1.6536E+00 | −9.0000E+01 | −1.7549E+01 |
| A4 = | −4.9648E−03 | −2.6337E−02 | −6.8975E−02 | −3.7159E−02 |
| A6 = | −1.0471E−02 | 4.5244E−03 | 1.3667E−02 | 6.0236E−03 |
| A8 = | 3.8122E−03 | −2.3282E−03 | −2.1905E−03 | −6.1848E−04 |
| A10 = | −1.5016E−03 | 8.8988E−04 | 5.6965E−04 | 2.1759E−05 |
| A12 = | 3.6088E−04 | −1.6904E−04 | −1.3557E−04 | 2.9732E−06 |
| A14 = | −3.5484E−05 | 1.5614E−05 | 1.8967E−05 | −4.3636E−07 |
| A16 = | | −5.6727E−07 | −1.0533E−06 | 1.9684E−08 |

In the 5th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 5th embodiment are as specified below.

| 5th Embodiment | | | |
|---|---|---|---|
| f [mm] | 4.09 | T56/CT6 | 3.35 |
| Fno | 2.53 | T56/(T34 + T45) | 5.52 |
| HFOV [deg.] | 42.8 | (T56 − SAG52 + SAG61)/T56 | 0.09 |
| V3 | 22.5 | R1/R6 | 2.17 |
| V3 + V4 | 78.5 | R6/|R5| | 0.29 |
| V5 | 37.4 | R12/f | 0.98 |
| V6 | 26.0 | f2/f4 | 1.43 |
| Dr1r4/Dr5r12 | 1.03 | |f6/f5| | 0.31 |
| T12/CT1 | 2.62 | Yc62/Y11 | 0.39 |

6th Embodiment

Figure 6A:
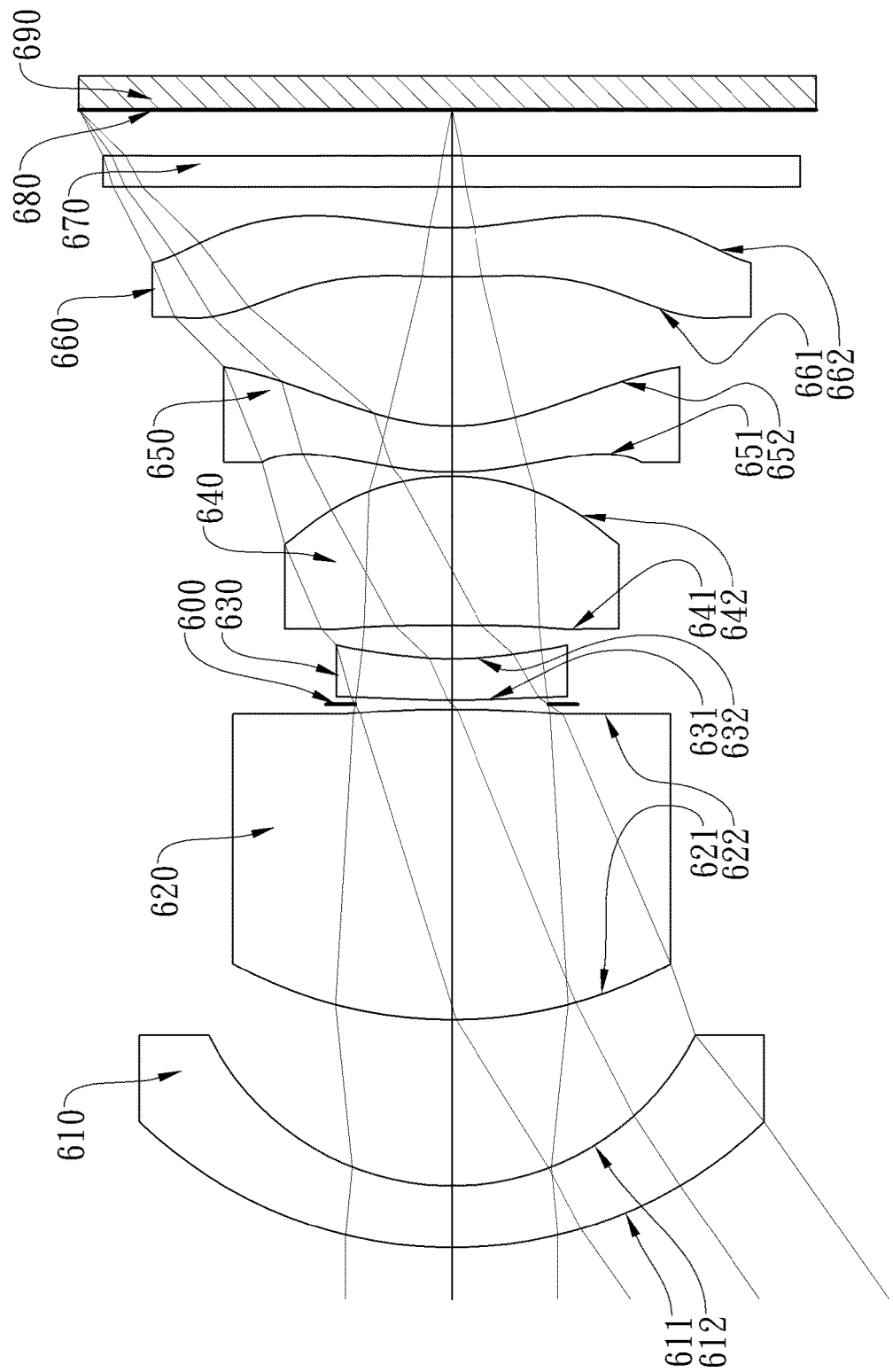
FIG. 6A is a schematic view of an imaging apparatus according to the 6th embodiment of the present disclosure.
Figure 6B:
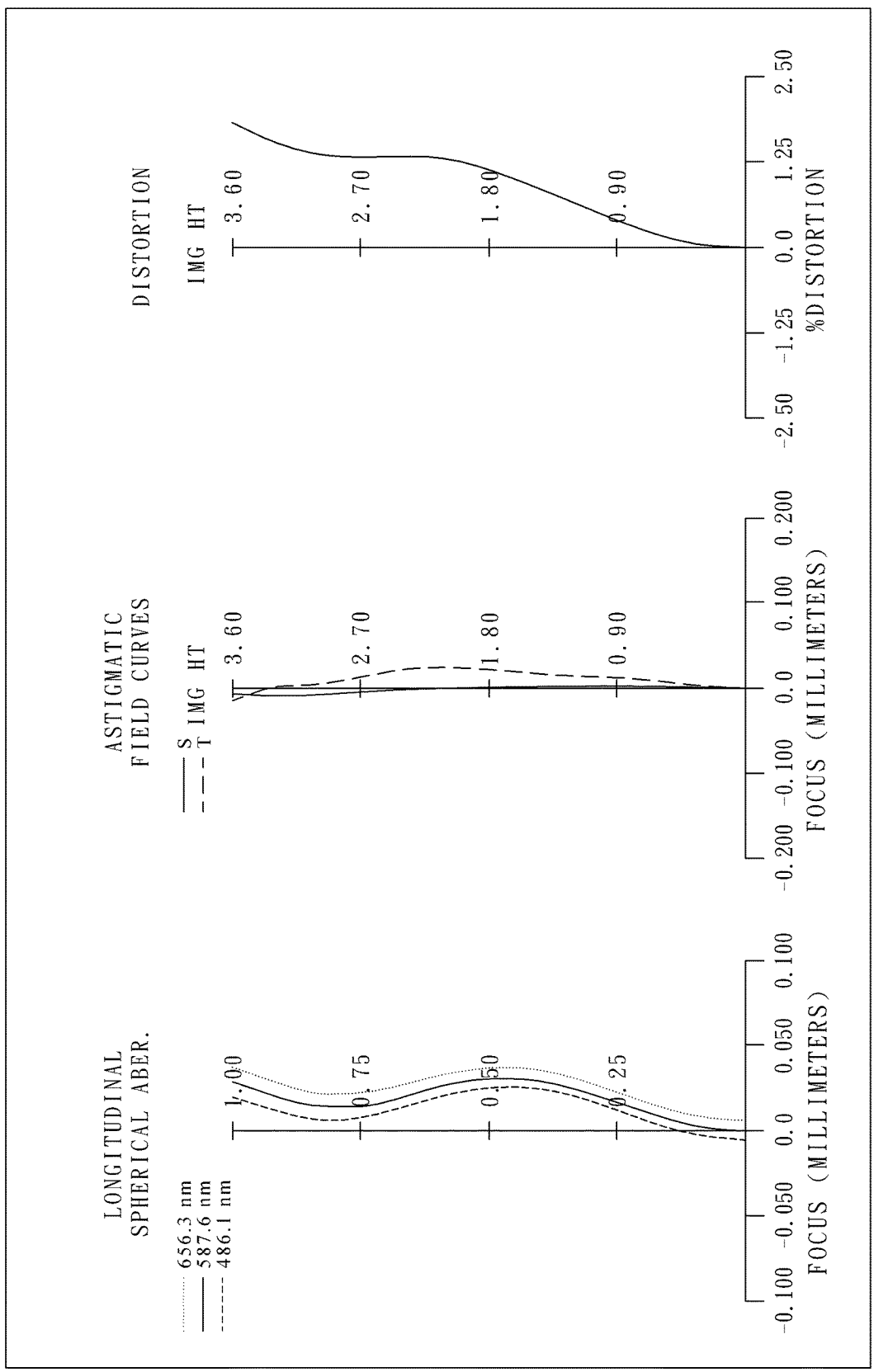
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an optical image capturing lens assembly (not otherwise herein labeled) of the present disclosure and an image sensor 690. The optical image capturing lens assembly includes, in order from an object side to an image side, a first lens element 610, a second lens element 620, an aperture stop 600, a third lens element 630, a fourth lens element 640, a fifth lens element 650 and a sixth lens element 660, wherein the optical image capturing lens assembly includes six lens elements (610, 620, 630, 640, 650, and 660) with no additional lens element disposed between the first lens element 610 and the sixth lens element 660.

The first lens element 610 with negative refractive power has an object-side surface 611 being convex in a paraxial region thereof and an image-side surface 612 being concave in a paraxial region thereof, and the first lens element 610 is made of glass.

The second lens element 620 with positive refractive power has an object-side surface 621 being convex in a paraxial region thereof and an image-side surface 622 being convex in a paraxial region thereof, and the second lens element 620 is made of glass.

The third lens element 630 with negative refractive power has an object-side surface 631 being convex in a paraxial region thereof and an image-side surface 632 being concave in a paraxial region thereof, which are both aspheric, and the third lens element 630 is made of plastic.

The fourth lens element 640 with positive refractive power has an object-side surface 641 being concave in a paraxial region thereof and an image-side surface 642 being convex in a paraxial region thereof, which are both aspheric, and the fourth lens element 640 is made of plastic.

The fifth lens element 650 with negative refractive power has an object-side surface 651 being convex in a paraxial region thereof and an image-side surface 652 being concave in a paraxial region thereof, which are both aspheric, and the fifth lens element 650 is made of plastic. Moreover, the object-side surface 651 has at least one critical point in an off-axis region thereof.

The sixth lens element 660 with negative refractive power has an object-side surface 661 being convex in a paraxial region thereof and an image-side surface 662 being concave in a paraxial region thereof, which are both aspheric, and the sixth lens element 660 is made of plastic. Moreover, the image-side surface 662 has at least one critical point including at least one convex critical point in an off-axis region thereof.

An IR-cut filter 670 is located between the sixth lens element 660 and an image surface 680. The IR-cut filter 670 is made of glass and it does not affect the focal length of the optical image capturing lens assembly. The image sensor 690 is disposed on or near the image surface 680 of the optical image capturing lens assembly.

The detailed optical data of the 6th embodiment are shown in TABLE 11, and the aspheric surface data of the 6th embodiment are shown in TABLE 12, wherein the units of the curvature radius, the thickness and the focal length are expressed in mm, and HFOV is defined as half of the maximum field of view.

TABLE 11

(6th Embodiment)
f = 5.00 mm, Fno = 2.44, HFOV = 35.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.344 | | 0.600 | Glass | 1.673 | 32.2 | −11.47 |
| 2 | | 2.625 | | 1.603 | | | | |
| 3 | Lens 2 | 4.395 | | 3.000 | Glass | 1.804 | 46.5 | 4.33 |
| 4 | | −11.610 | | 0.049 | | | | |
| 5 | Ape. Stop | Plano | | 0.040 | | | | |
| 6 | Lens 3 | 8.617 | ASP | 0.400 | Plastic | 1.669 | 19.5 | −9.35 |
| 7 | | 3.555 | ASP | 0.320 | | | | |
| 8 | Lens 4 | −172.414 | ASP | 1.439 | Plastic | 1.544 | 56.0 | 4.35 |
| 9 | | −2.341 | ASP | 0.040 | | | | |
| 10 | Lens 5 | 2.953 | ASP | 0.449 | Plastic | 1.614 | 26.0 | −15.12 |
| 11 | | 2.111 | ASP | 1.437 | | | | |
| 12 | Lens 6 | 9.159 | ASP | 0.474 | Plastic | 1.614 | 26.0 | −7.08 |
| 13 | | 2.888 | ASP | 0.400 | | | | |
| 14 | IR-cut filter | Plano | | 0.300 | Glass | 1.517 | 64.2 | — |
| 15 | | Plano | | 0.443 | | | | |
| 16 | Image surface | Plano | | — | | | | |

Note:
Reference wavelength is d-line 587.6 nm

TABLE 12

Aspheric Coefficients

| | Surface # | | | |
|---|---|---|---|---|
| | 6 | 7 | 8 | 9 |
| k = | −2.7781E+00 | 5.4069E−01 | 9.0000E+01 | −4.6613E−01 |
| A4 = | −3.7247E−02 | −4.9669E−02 | −2.7609E−02 | −1.6276E−02 |
| A6 = | 1.2094E−02 | 1.3444E−03 | 1.9530E−02 | 4.9025E−03 |
| A8 = | 1.0146E−02 | −5.2488E−02 | −3.3737E−03 | |
| A10 = | −1.3460E−03 | 1.8124E−03 | 4.6777E−02 | 6.3282E−04 |
| A12 = | | −8.8089E−04 | −1.0890E−02 | 1.3611E−04 |
| A14 = | | | | −2.7773E−06 |

TABLE 12-continued

| Aspheric Coefficients | | | |
|---|---|---|---|
| Surface # | | | |
| 10 | 11 | 12 | 13 |
| k = −1.3303E+01 | −2.6021E+00 | 1.1403E+00 | −1.0629E+01 |
| A4 = 1.5229E−02 | −1.1936E−02 | −9.0634E−02 | −5.4402E−02 |
| A6 = −3.2073E−02 | −6.2789E−03 | 3.1350E−02 | 1.7988E−02 |
| A8 = 1.6934E−02 | 4.4235E−03 | −9.0383E−03 | −5.0728E−03 |
| A10 = −6.0231E−03 | −1.4138E−03 | 2.0095E−03 | 9.6571E−04 |
| A12 = 1.2584E−03 | 2.5811E−04 | −2.6864E−04 | −1.1480E−04 |
| A14 = −1.2140E−04 | −2.6536E−05 | 1.8861E−05 | 7.7486E−06 |
| A16 = | 1.1901E−06 | −5.3844E−07 | −2.2239E−07 |

In the 6th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 6th embodiment are as specified below.

| 6th Embodiment | | | |
|---|---|---|---|
| f [mm] | 5.00 | T56/CT6 | 3.03 |
| Fno | 2.44 | T56/(T34 + T45) | 3.99 |
| HFOV [deg.] | 35.1 | (T56 − SAG52 + SAG61)/T56 | 0.33 |
| V3 | 19.5 | R1/R6 | 1.22 |
| V3 + V4 | 75.4 | R6/|R5| | 0.41 |
| V5 | 26.0 | R12/f | 0.58 |
| V6 | 26.0 | f2/f4 | 0.99 |
| Dr1r4/Dr5r12 | 1.14 | |f6/f5| | 0.47 |
| T12/CT1 | 2.67 | Yc62/Y11 | 0.44 |

7th Embodiment

Figure 7A:
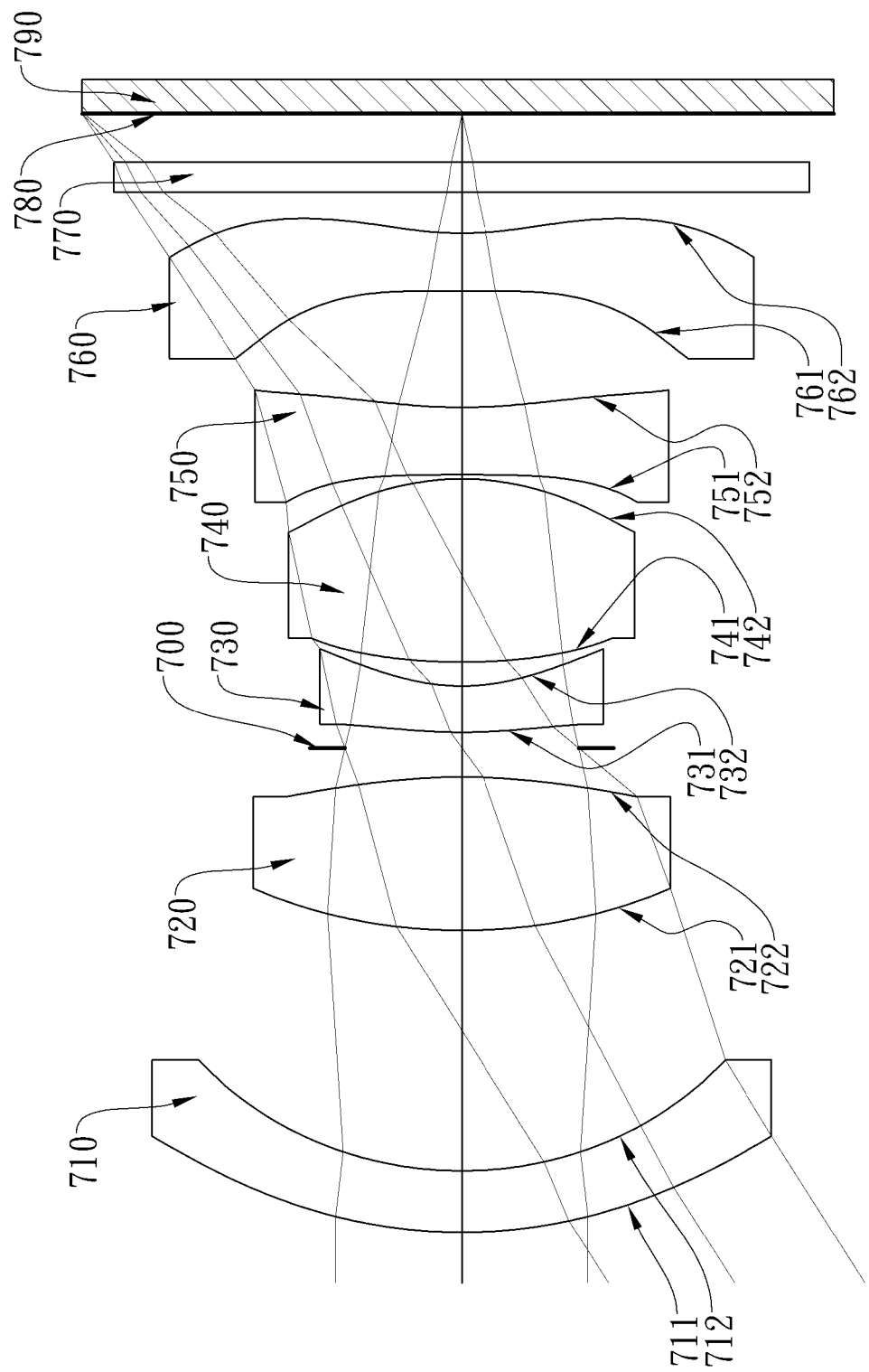
FIG. 7A is a schematic view of an imaging apparatus according to the 7th embodiment of the present disclosure.
Figure 7B:
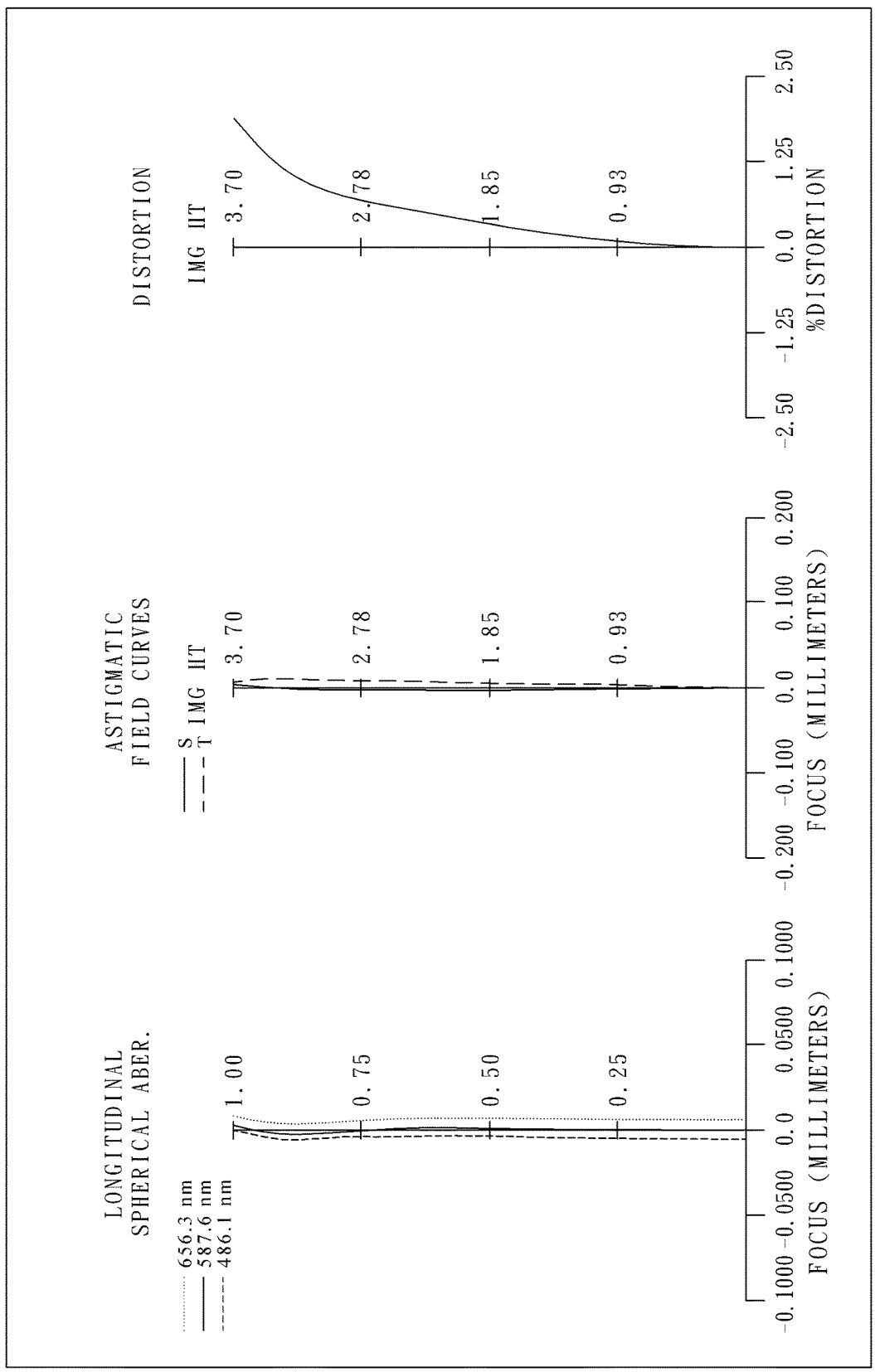
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an optical image capturing lens assembly (not otherwise herein labeled) of the present disclosure and an image sensor 790. The optical image capturing lens assembly includes, in order from an object side to an image side, a first lens element 710, a second lens element 720, an aperture stop 700, a third lens element 730, a fourth lens element 740, a fifth lens element 750 and a sixth lens element 760, wherein the optical image capturing lens assembly includes six lens elements (710, 720, 730, 740, 750, and 760) with no additional lens element disposed between the first lens element 710 and the sixth lens element 760.

The first lens element 710 with negative refractive power has an object-side surface 711 being convex in a paraxial region thereof and an image-side surface 712 being concave in a paraxial region thereof, which are both aspheric, and the first lens element 710 is made of glass.

The second lens element 720 with positive refractive power has an object-side surface 721 being convex in a paraxial region thereof and an image-side surface 722 being convex in a paraxial region thereof, which are both aspheric, and the second lens element 720 is made of glass.

The third lens element 730 with negative refractive power has an object-side surface 731 being convex in a paraxial region thereof and an image-side surface 732 being concave in a paraxial region thereof, which are both aspheric, and the third lens element 730 is made of plastic.

The fourth lens element 740 with positive refractive power has an object-side surface 741 being convex in a paraxial region thereof and an image-side surface 742 being convex in a paraxial region thereof, which are both aspheric, and the fourth lens element 740 is made of plastic.

The fifth lens element 750 with negative refractive power has an object-side surface 751 being concave in a paraxial region thereof and an image-side surface 752 being concave in a paraxial region thereof, which are both aspheric, and the fifth lens element 750 is made of plastic.

The sixth lens element 760 with negative refractive power has an object-side surface 761 being convex in a paraxial region thereof and an image-side surface 762 being concave in a paraxial region thereof, which are both aspheric, and the sixth lens element 760 is made of plastic. Moreover, the image-side surface 762 has at least one critical point including at least one convex critical point in an off-axis region thereof.

An IR-cut filter 770 is located between the sixth lens element 760 and an image surface 780. The IR-cut filter 770 is made of glass and it does not affect the focal length of the optical image capturing lens assembly. The image sensor 790 is disposed on or near the image surface 780 of the optical image capturing lens assembly.

The detailed optical data of the 7th embodiment are shown in TABLE 13, and the aspheric surface data of the 7th embodiment are shown in TABLE 14, wherein the units of the curvature radius, the thickness and the focal length are expressed in mm, and HFOV is defined as half of the maximum field of view.

TABLE 13

(7th Embodiment)
f = 5.71 mm, Fno = 2.32, HFOV = 32.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 4.936 ASP | 0.600 | Glass | 1.839 | 23.9 | −24.00 |

TABLE 13-continued (7th Embodiment)
f = 5.71 mm, Fno = 2.32, HFOV = 32.4 deg.

| Surface # | | Curvature Radius | Thickness | Material | Index | Abbe # | Focal Length |
|---|---|---|---|---|---|---|---|
| 2 | | 3.744 ASP | 2.347 | | | | |
| 3 | Lens 2 | 5.449 ASP | 1.494 | Glass | 1.694 | 56.3 | 4.39 |
| 4 | | −6.132 ASP | 0.283 | | | | |
| 5 | Ape. Stop | Plano | 0.152 | | | | |
| 6 | Lens 3 | 5.156 ASP | 0.456 | Plastic | 1.566 | 37.4 | −5.98 |
| 7 | | 1.978 ASP | 0.234 | | | | |
| 8 | Lens 4 | 5.905 ASP | 1.784 | Plastic | 1.544 | 56.0 | 3.58 |
| 9 | | −2.599 ASP | 0.040 | | | | |
| 10 | Lens 5 | −40.373 ASP | 0.662 | Plastic | 1.614 | 26.0 | −7.37 |
| 11 | | 5.126 ASP | 1.130 | | | | |
| 12 | Lens 6 | 23.413 ASP | 0.566 | Plastic | 1.511 | 56.8 | −6.89 |
| 13 | | 3.034 ASP | 0.400 | | | | |
| 14 | IR-cut filter | Plano | 0.300 | Glass | 1.517 | 64.2 | — |
| 15 | | Plano | 0.470 | | | | |
| 16 | Image surface | Plano | — | | | | |

Note:
Reference wavelength is d-line 587.6 nm

TABLE 14

Aspheric Coefficients

| | Surface # | | | |
|---|---|---|---|---|
| | 1 | 2 | 3 | 4 |
| k = | −3.0873E−01 | 1.6272E−01 | 2.8456E−01 | −1.1583E+01 |
| A4 = | −1.6804E−04 | 4.2417E−04 | 4.2158E−04 | 3.7081E−03 |
| A6 = | −1.4685E−05 | 5.6528E−05 | 1.3202E−04 | −1.1767E−03 |
| A8 = | −4.7906E−06 | −3.9370E−06 | −1.8558E−05 | 1.1151E−04 |

| | Surface # | | | |
|---|---|---|---|---|
| | 6 | 7 | 8 | 9 |
| k = | 4.9471E−01 | −9.9810E−01 | −3.3861E+01 | −1.1577E+00 |
| A4 = | −3.9048E−02 | −5.3644E−02 | 2.6768E−02 | 9.9872E−03 |
| A6 = | 8.8996E−03 | 2.0374E−02 | −5.5869E−03 | −1.0687E−02 |
| A8 = | −2.4740E−03 | −8.7488E−03 | 4.5386E−03 | 3.9359E−03 |
| A10 = | | 3.1796E−03 | 1.2372E−03 | −3.6139E−04 |
| A12 = | | −6.3838E−04 | −3.6123E−04 | −1.0866E−04 |
| A14 = | | | | 3.3408E−05 |

| | Surface # | | | |
|---|---|---|---|---|
| | 10 | 11 | 12 | 13 |
| k = | 9.0000E+01 | −3.5741E−01 | −8.7421E+01 | −1.1387E+01 |
| A4 = | −2.2222E−02 | −3.0677E−02 | −7.3375E−02 | −3.5478E−02 |
| A6 = | −2.4762E−03 | 1.0154E−02 | 2.1574E−02 | 8.8542E−03 |
| A8 = | −1.2017E−03 | −5.0860E−03 | −5.6926E−03 | −1.7851E−03 |
| A10 = | 1.3156E−03 | 1.9355E−03 | 1.1398E−03 | 2.3035E−04 |
| A12 = | −3.2176E−04 | −4.1510E−04 | −2.0568E−04 | −1.9006E−05 |
| A14 = | 1.7599E−05 | 4.7240E−05 | 2.8039E−05 | 9.5408E−07 |
| A16 = | | −2.2190E−06 | −1.5613E−06 | −2.2105E−08 |

In the 7th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 7th embodiment are as specified below.

| 7th Embodiment | | | |
|---|---|---|---|
| f [mm] | 5.71 | T56/CT6 | 2.00 |
| Fno | 2.32 | T56/(T34 + T45) | 4.12 |
| HFOV [deg.] | 32.4 | (T56 − SAG52 + SAG61)/T56 | 0.27 |
| V3 | 37.4 | R1/R6 | 2.50 |
| V3 + V4 | 93.4 | R6/|R5| | 0.38 |
| V5 | 26.0 | R12/f | 0.53 |
| V6 | 56.8 | f2/f4 | 1.23 |
| Dr1r4/Dr5r12 | 0.91 | |f6/f5| | 0.93 |
| T12/CT1 | 3.91 | Yc62/Y11 | 0.51 |

8th Embodiment

Figure 8A:
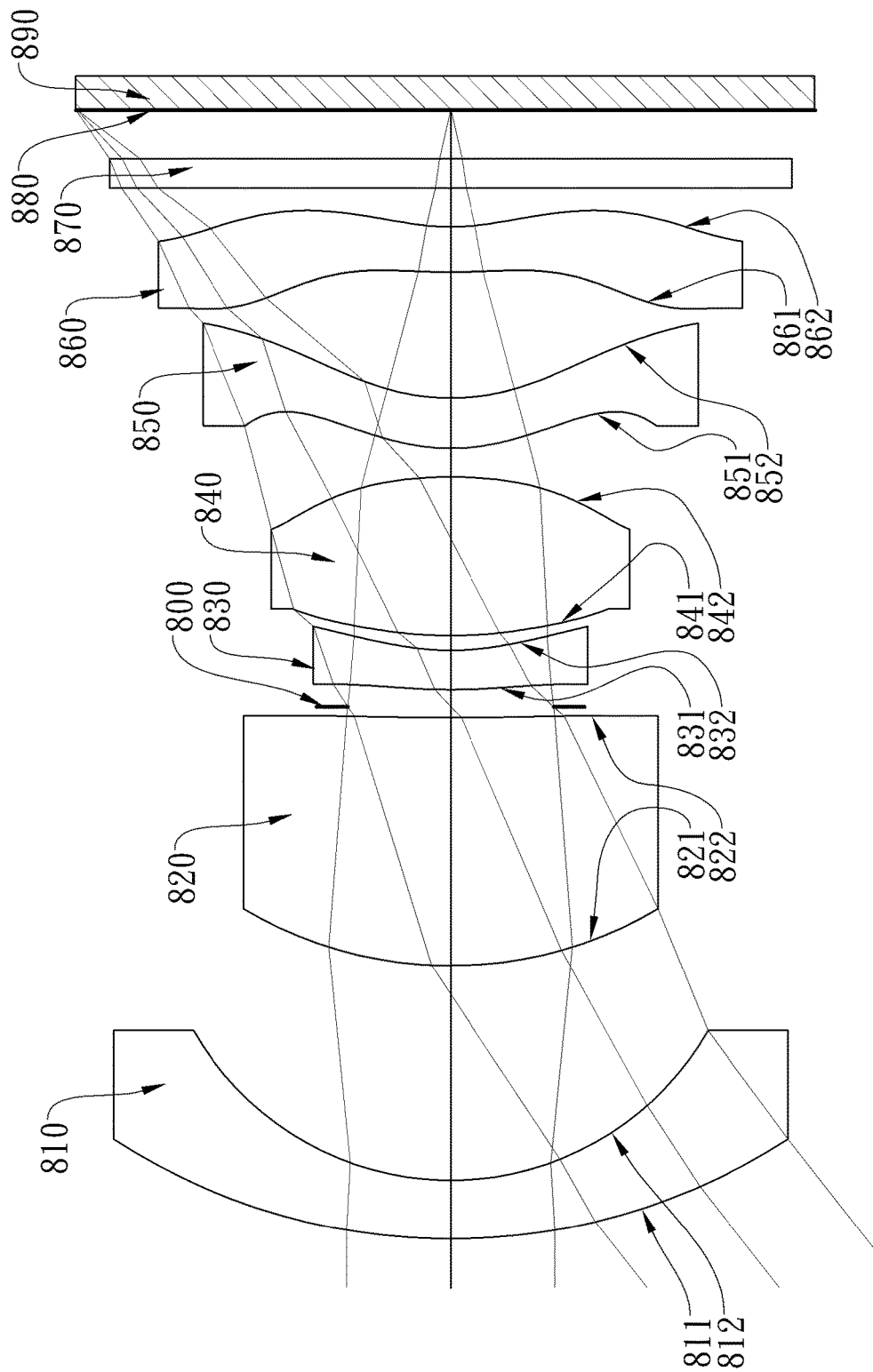
FIG. 8A is a schematic view of an imaging apparatus according to the 8th embodiment of the present disclosure.
Figure 8B:
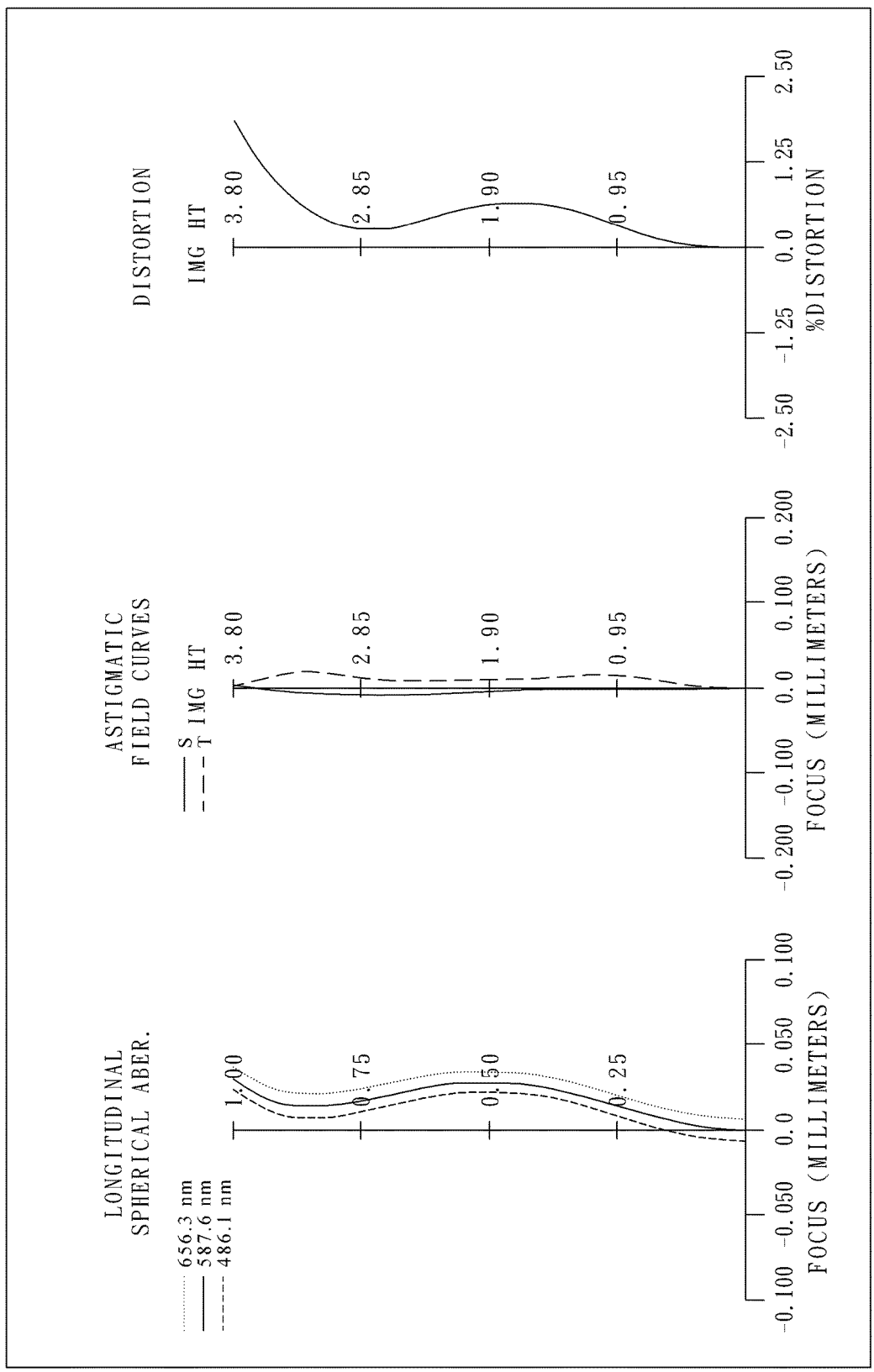
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an optical image capturing lens assembly (not otherwise herein labeled) of the present disclosure and an image sensor 890. The optical image capturing lens assembly includes, in order from an object side to an image side, a first lens element 810, a second lens element 820, an aperture stop 800, a third lens element 830, a fourth lens element 840, a fifth lens element 850 and a sixth lens element 860, wherein the optical image capturing lens assembly includes six lens elements (810, 820, 830, 840, 850, and 860) with no additional lens element disposed between the first lens element 810 and the sixth lens element 860.

The first lens element 810 with negative refractive power has an object-side surface 811 being convex in a paraxial region thereof and an image-side surface 812 being concave in a paraxial region thereof, and the first lens element 810 is made of glass.

The second lens element 820 with positive refractive power has an object-side surface 821 being convex in a paraxial region thereof and an image-side surface 822 being concave in a paraxial region thereof, and the second lens element 820 is made of glass.

The third lens element 830 with negative refractive power has an object-side surface 831 being convex in a paraxial region thereof and an image-side surface 832 being concave in a paraxial region thereof, which are both aspheric, and the third lens element 830 is made of plastic.

The fourth lens element 840 with positive refractive power has an object-side surface 841 being convex in a paraxial region thereof and an image-side surface 842 being convex in a paraxial region thereof, which are both aspheric, and the fourth lens element 840 is made of plastic.

The fifth lens element 850 with positive refractive power has an object-side surface 851 being convex in a paraxial region thereof and an image-side surface 852 being concave in a paraxial region thereof, which are both aspheric, and the fifth lens element 850 is made of plastic. Moreover, the object-side surface 851 has at least one critical point in an off-axis region thereof.

The sixth lens element 860 with negative refractive power has an object-side surface 861 being convex in a paraxial region thereof and an image-side surface 862 being concave in a paraxial region thereof, which are both aspheric, and the sixth lens element 860 is made of plastic. Moreover, the image-side surface 862 has at least one critical point including at least one convex critical point in an off-axis region thereof.

An IR-cut filter 870 is located between the sixth lens element 860 and an image surface 880. The IR-cut filter 870 is made of glass and it does not affect the focal length of the optical image capturing lens assembly. The image sensor 890 is disposed on or near the image surface 880 of the optical image capturing lens assembly.

The detailed optical data of the 8th embodiment are shown in TABLE 15, and the aspheric surface data of the 8th embodiment are shown in TABLE 16, wherein the units of the curvature radius, the thickness and the focal length are expressed in mm, and HFOV is defined as half of the maximum field of view.

TABLE 15

(8th Embodiment)
f = 4.73 mm, Fno = 2.23, HFOV = 38.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.286 | | 0.600 | Glass | 1.517 | 64.2 | −11.91 |
| 2 | | 3.009 | | 2.185 | | | | |
| 3 | Lens 2 | 4.108 | | 2.524 | Glass | 1.729 | 54.7 | 6.10 |
| 4 | | 40.244 | | 0.117 | | | | |
| 5 | Ape. Stop | Plano | | 0.174 | | | | |
| 6 | Lens 3 | 5.632 | ASP | 0.400 | Plastic | 1.669 | 19.5 | −7.59 |
| 7 | | 2.594 | ASP | 0.150 | | | | |
| 8 | Lens 4 | 4.264 | ASP | 1.612 | Plastic | 1.544 | 56.0 | 4.42 |
| 9 | | −4.773 | ASP | 0.298 | | | | |
| 10 | Lens 5 | 2.059 | ASP | 0.512 | Plastic | 1.544 | 56.0 | 21.83 |
| 11 | | 2.273 | ASP | 1.280 | | | | |
| 12 | Lens 6 | 5.748 | ASP | 0.460 | Plastic | 1.566 | 37.4 | −6.94 |
| 13 | | 2.266 | ASP | 0.400 | | | | |
| 14 | IR-cut filter | Plano | | 0.300 | Glass | 1.517 | 64.2 | — |
| 15 | | Plano | | 0.493 | | | | |
| 16 | Image surface | Plano | | — | | | | |

Note:
Reference wavelength is d-line 587.6 nm

TABLE 16

Aspheric Coefficients

| Surface # | | | | |
|---|---|---|---|---|
| | 6 | 7 | 8 | 9 |
| k = | −4.6044E+00 | −1.1393E+00 | −2.7764E+01 | 1.7968E+00 |
| A4 = | −4.8102E−02 | −5.7643E−02 | 2.9891E−02 | −4.4452E−02 |
| A6 = | 1.7393E−02 | 1.5784E−02 | −2.6974E−02 | 2.2030E−02 |
| A8 = | −5.2919E−03 | 4.0256E−04 | 1.4520E−02 | −9.5881E−03 |
| A10 = | | −1.6141E−03 | −3.3966E−03 | 2.9603E−03 |
| A12 = | | 2.3370E−04 | 3.1220E−04 | −5.8390E−04 |
| A14 = | | | | 6.7290E−05 |

| Surface # | | | | |
|---|---|---|---|---|
| | 10 | 11 | 12 | 13 |
| k = | −4.9741E+00 | −1.2329E+00 | −2.1922E+00 | −8.9402E+00 |
| A4 = | 1.5737E−02 | 1.1586E−02 | −1.1505E−01 | −5.0083E−02 |
| A6 = | −1.3574E−02 | −1.5585E−02 | 4.2848E−02 | 1.4411E−02 |
| A8 = | 1.3690E−03 | 3.4599E−03 | −1.4633E−02 | −3.7255E−03 |
| A10 = | 1.1532E−04 | −2.6994E−04 | 3.9492E−03 | 6.9296E−04 |
| A12 = | −8.0118E−05 | −1.7470E−05 | −6.3002E−04 | −7.9528E−05 |
| A14 = | 9.4270E−06 | 4.6989E−06 | 5.2142E−05 | 5.0859E−06 |
| A16 = | | −2.5586E−07 | −1.7454E−06 | −1.3834E−07 |

In the 8th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 8th embodiment are specified as below.

| 8th Embodiment | | | |
|---|---|---|---|
| f [mm] | 4.73 | T56/CT6 | 2.78 |
| Fno | 2.23 | T56/(T34 + T45) | 2.86 |
| HFOV [deg.] | 38.1 | (T56 − SAG52 + SAG61)/T56 | 0.12 |
| V3 | 19.5 | R1/R6 | 2.42 |
| V3 + V4 | 75.4 | R6/|R5| | 0.46 |
| V5 | 56.0 | R12/f | 0.48 |
| V6 | 37.4 | f2/f4 | 1.38 |
| Dr1r4/Dr5r12 | 1.13 | |f6/f5| | 0.32 |
| T12/CT1 | 3.64 | Yc62/Y11 | 0.42 |

9th Embodiment

Figure 9A:
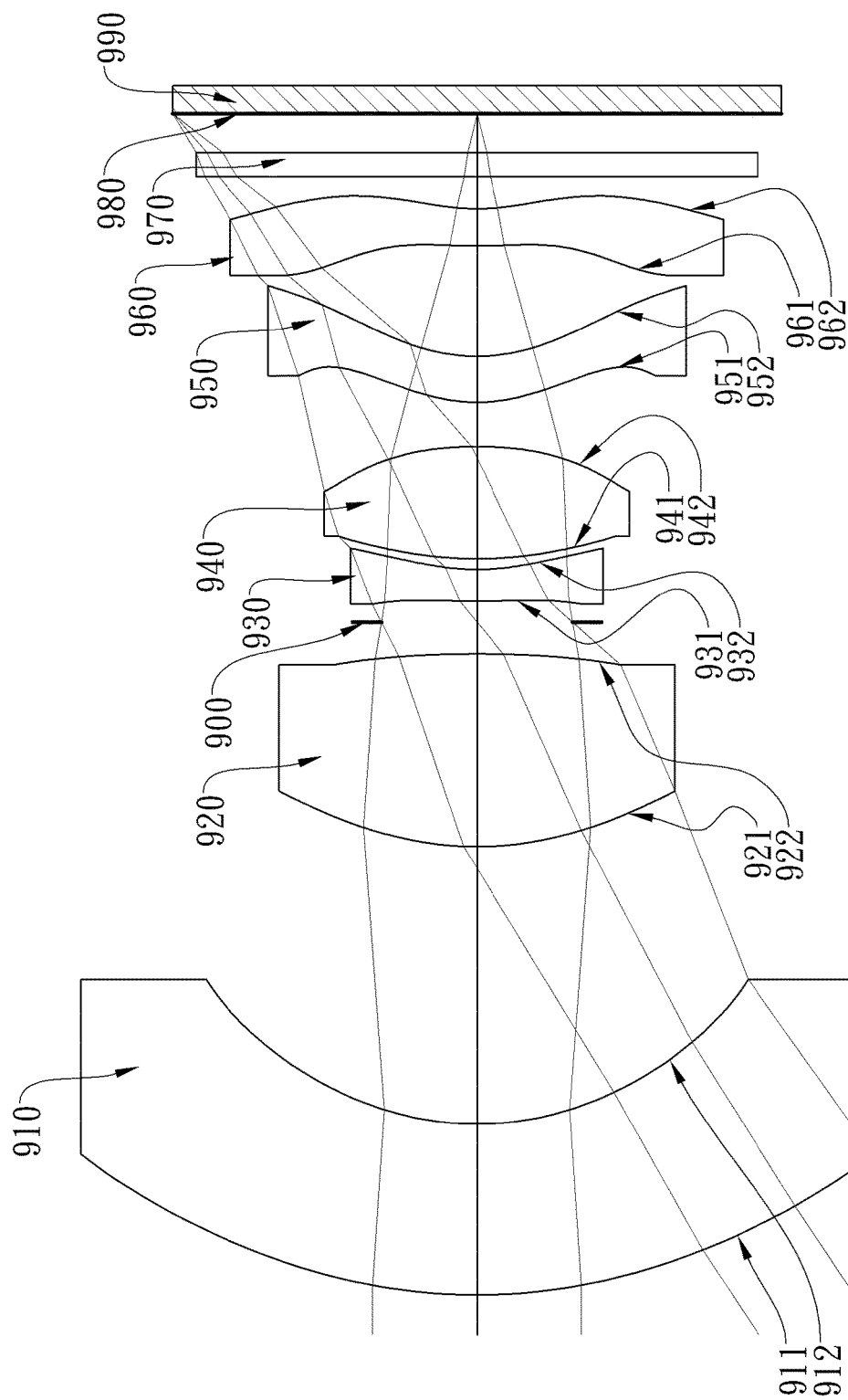
FIG. 9A is a schematic view of an imaging apparatus according to the 9th embodiment of the present disclosure.
Figure 9B:
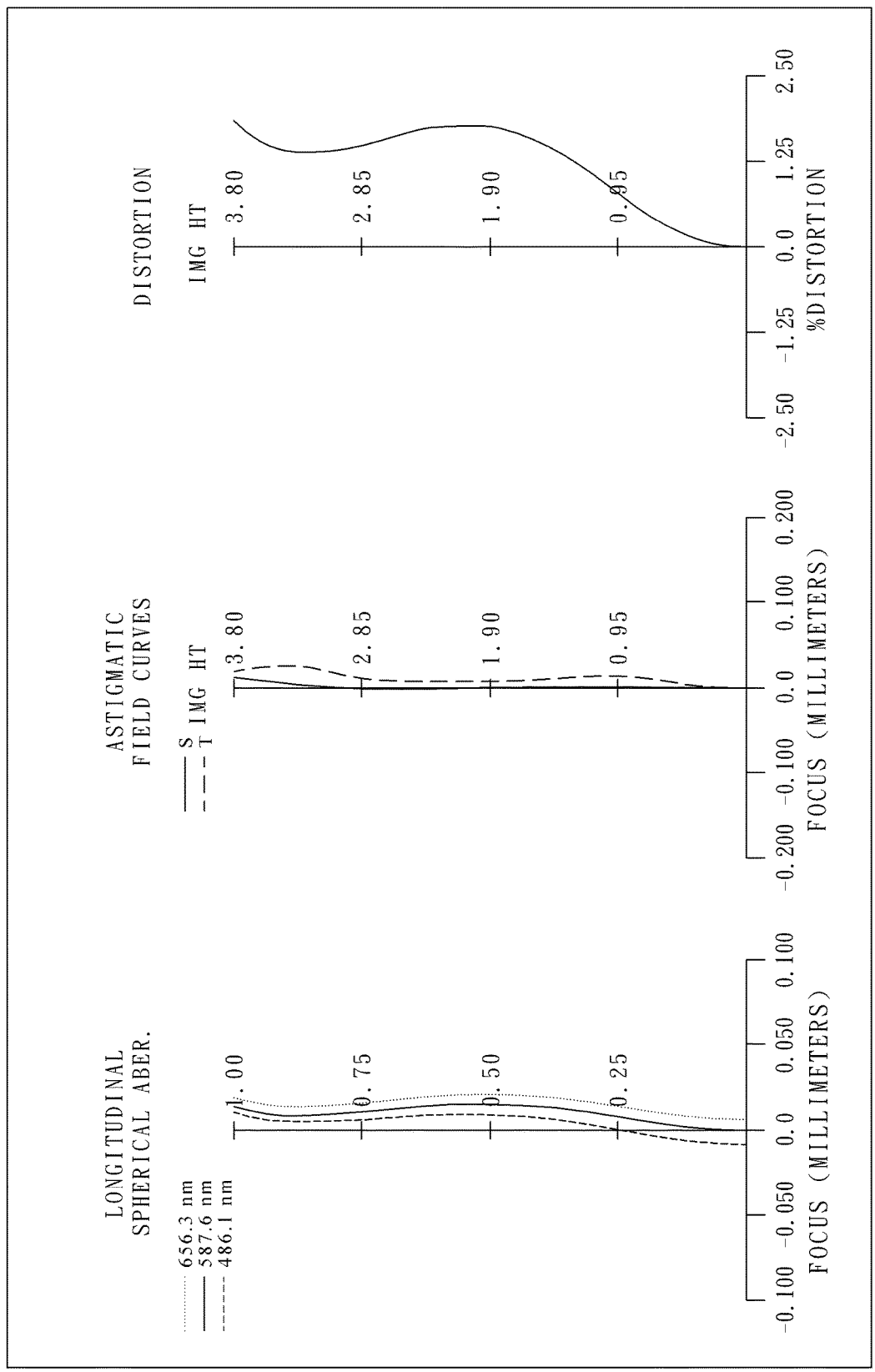
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an optical image capturing lens assembly (not otherwise herein labeled) of the present disclosure and an image sensor 990. The optical image capturing lens assembly includes, in order from an object side to an image side, a first lens element 910, a second lens element 920, an aperture stop 900, a third lens element 930, a fourth lens element 940, a fifth lens element 950 and a sixth lens element 960, wherein the optical image capturing lens assembly includes six lens elements (910, 920, 930, 940, 950, and 960) with no additional lens element disposed between the first lens element 910 and the sixth lens element 960.

The first lens element 910 with negative refractive power has an object-side surface 911 being convex in a paraxial region thereof and an image-side surface 912 being concave in a paraxial region thereof, which are both aspheric, and the first lens element 910 is made of plastic.

The second lens element 920 with positive refractive power has an object-side surface 921 being convex in a paraxial region thereof and an image-side surface 922 being convex in a paraxial region thereof, which are both aspheric, and the second lens element 920 is made of plastic.

The third lens element 930 with negative refractive power has an object-side surface 931 being convex in a paraxial region thereof and an image-side surface 932 being concave in a paraxial region thereof, which are both aspheric, and the third lens element 930 is made of plastic.

The fourth lens element 940 with positive refractive power has an object-side surface 941 being convex in a paraxial region thereof and an image-side surface 942 being convex in a paraxial region thereof, which are both aspheric, and the fourth lens element 940 is made of plastic.

The fifth lens element 950 with positive refractive power has an object-side surface 951 being convex in a paraxial region thereof and an image-side surface 952 being concave in a paraxial region thereof, which are both aspheric, and the fifth lens element 950 is made of plastic. Moreover, the object-side surface 951 has at least one critical point in an off-axis region thereof.

The sixth lens element 960 with negative refractive power has an object-side surface 961 being convex in a paraxial region thereof and an image-side surface 962 being concave in a paraxial region thereof, which are both aspheric, and the sixth lens element 960 is made of plastic. Moreover, the image-side surface 962 has at least one critical point including at least one convex critical point in an off-axis region thereof.

An IR-cut filter 970 is located between the sixth lens element 960 and an image surface 980. The IR-cut filter 970 is made of glass and it does not affect the focal length of the optical image capturing lens assembly. The image sensor 990 is disposed on or near the image surface 980 of the optical image capturing lens assembly.

The detailed optical data of the 9th embodiment are shown in TABLE 17, and the aspheric surface data of the 9th embodiment are shown in TABLE 18, wherein the units of the curvature radius, the thickness and the focal length are expressed in mm, and HFOV is defined as half of the maximum field of view.

TABLE 17

(9th Embodiment)
f = 5.57 mm, Fno = 2.14, HFOV = 33.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.096 | ASP | 2.135 | Plastic | 1.566 | 37.4 | −18.62 |
| 2 | | 3.780 | ASP | 3.468 | | | | |
| 3 | Lens 2 | 4.162 | ASP | 2.400 | Plastic | 1.544 | 56.0 | 6.32 |
| 4 | | −15.711 | ASP | 0.399 | | | | |
| 5 | Ape. Stop | Plano | | 0.262 | | | | |
| 6 | Lens 3 | 12.010 | ASP | 0.400 | Plastic | 1.614 | 26.0 | −6.16 |
| 7 | | 2.839 | ASP | 0.134 | | | | |
| 8 | Lens 4 | 4.702 | ASP | 1.399 | Plastic | 1.544 | 56.0 | 4.77 |
| 9 | | −5.177 | ASP | 0.555 | | | | |
| 10 | Lens 5 | 2.071 | ASP | 0.571 | Plastic | 1.544 | 56.0 | 24.47 |
| 11 | | 2.215 | ASP | 1.385 | | | | |
| 12 | Lens 6 | 6.779 | ASP | 0.460 | Plastic | 1.566 | 37.4 | −7.16 |
| 13 | | 2.474 | ASP | 0.400 | | | | |
| 14 | IR-cut filter | Plano | | 0.300 | Glass | 1.517 | 64.2 | — |
| 15 | | Plano | | 0.488 | | | | |
| 16 | Image surface | Plano | | — | | | | |

Note:
Reference wavelength is d-line 587.6 nm

TABLE 18A

Aspheric Coefficients

| | Surface # | | | |
|---|---|---|---|---|
| | 1 | 2 | 3 | 4 |
| k = | −6.1680E−02 | 1.9913E−03 | −6.4898E−01 | 1.2911E+01 |
| A4 = | −2.1279E−04 | −1.0463E−03 | −9.4963E−04 | −2.9219E−03 |
| A6 = | −1.9893E−05 | −1.2084E−04 | −1.7063E−04 | 4.6050E−05 |
| A8 = | 5.3731E−07 | 1.5724E−06 | 7.1077E−06 | 1.7593E−05 |

| | Surface # | | | |
|---|---|---|---|---|
| | 6 | 7 | 8 | 9 |
| k = | −1.6825E+01 | −8.3121E−01 | −2.6707E+01 | 2.4372E+00 |
| A4 = | −4.7132E−02 | −4.6005E−02 | 2.5764E−02 | −3.6315E−02 |
| A6 = | 1.0084E−02 | 1.3027E−02 | −1.2785E−02 | 1.6501E−02 |
| A8 = | −1.8624E−03 | −4.7053E−03 | 2.9079E−03 | −6.7819E−03 |
| A10 = | | 1.4560E−03 | −1.3860E−04 | 2.0158E−03 |
| A12 = | | −2.2069E−04 | −1.5448E−05 | −3.7894E−04 |
| A14 = | | | | 3.7185E−05 |

| | Surface # | | | |
|---|---|---|---|---|
| | 10 | 11 | 12 | 13 |
| k = | −4.7084E+00 | −1.2763E+00 | −1.9422E−01 | −9.0369E+00 |
| A4 = | 1.1753E−02 | −5.0809E−03 | −1.0371E−01 | −4.7122E−02 |
| A6 = | −7.9879E−03 | −4.5673E−04 | 3.3005E−02 | 1.2850E−02 |
| A8 = | 8.3862E−04 | −1.3838E−03 | −8.6960E−03 | −2.7804E−03 |
| A10 = | −1.2416E−04 | 4.9883E−04 | 2.0369E−03 | 4.4328E−04 |
| A12 = | 2.5668E−06 | −7.4096E−05 | −3.0677E−04 | −4.5824E−05 |
| A14 = | 1.5616E−06 | 5.3822E−06 | 2.4498E−05 | 2.6997E−06 |
| A16 = | | −1.6011E−07 | −7.9467E−07 | −6.8478E−08 |

In the 9th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions equations in the 9th embodiment are as specified below.

| 9th Embodiment | | | |
|---|---|---|---|
| f [mm] | 5.57 | T56/CT6 | 3.01 |
| Fno | 2.14 | T56/(T34 + T45) | 2.01 |
| HFOV [deg.] | 33.7 | (T56 − SAG52 + SAG61)/T56 | 0.09 |
| V3 | 26.0 | R1/R6 | 2.50 |
| V3 + V4 | 82.0 | R6/|R5| | 0.24 |
| V5 | 56.0 | R12/f | 0.44 |

-continued

| 9th Embodiment | | | |
|---|---|---|---|
| V6 | 37.4 | f2/f4 | 1.33 |
| Dr1r4/Dr5r12 | 1.63 | \|f6/f5\| | 0.29 |
| T12/CT1 | 1.62 | Yc62/Y11 | 0.31 |

10th Embodiment

Figure 10A:
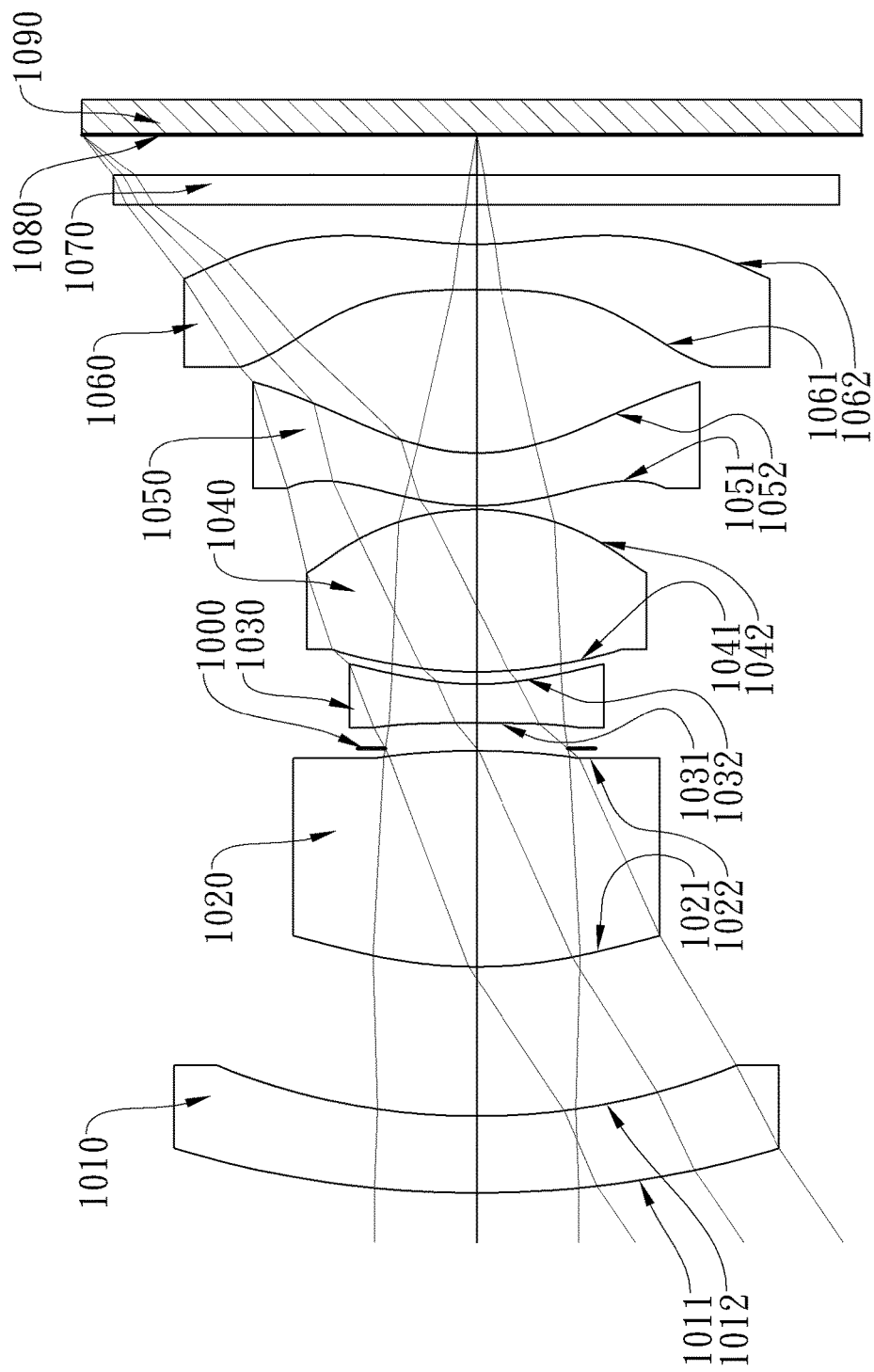
FIG. 10A is a schematic view of an imaging apparatus according to the 10th embodiment of the present disclosure.
Figure 10B:
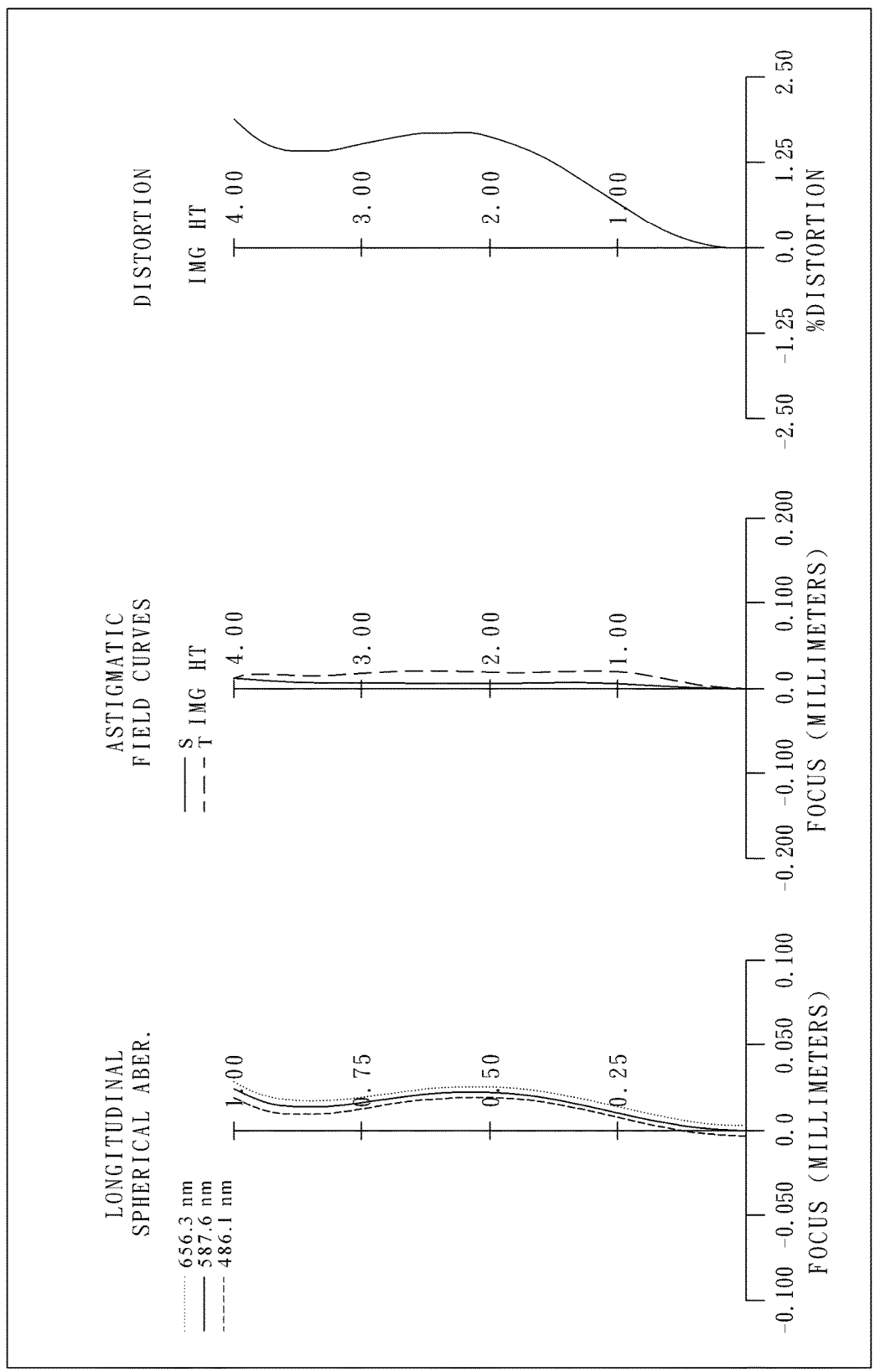
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes an optical image capturing lens assembly (not otherwise herein labeled) of the present disclosure and an image sensor 1090. The optical image capturing lens assembly includes, in order from an object side to an image side, a first lens element 1010, a second lens element 1020, an aperture stop 1000, a third lens element 1030, a fourth lens element 1040, a fifth lens element 1050 and a sixth lens element 1060, wherein the optical image capturing lens assembly includes six lens elements (1010, 1020, 1030, 1040, 1050, and 1060) with no additional lens element disposed between the first lens element 1010 and the sixth lens element 1060.

The first lens element 1010 with negative refractive power has an object-side surface 1011 being convex in a paraxial region thereof and an image-side surface 1012 being concave in a paraxial region thereof, which are both aspheric, and the first lens element 1010 is made of plastic.

The second lens element 1020 with positive refractive power has an object-side surface 1021 being convex in a paraxial region thereof and an image-side surface 1022 being convex in a paraxial region thereof, which are both aspheric, and the second lens element 1020 is made of plastic.

The third lens element 1030 with negative refractive power has an object-side surface 1031 being concave in a paraxial region thereof and an image-side surface 1032 being concave in a paraxial region thereof, which are both aspheric, and the third lens element 1030 is made of plastic.

The fourth lens element 1040 with positive refractive power has an object-side surface 1041 being convex in a paraxial region thereof and an image-side surface 1042 being convex in a paraxial region thereof, which are both aspheric, and the fourth lens element 1040 is made of plastic.

The fifth lens element 1050 with negative refractive power has an object-side surface 1051 being convex in a paraxial region thereof and an image-side surface 1052 being concave in a paraxial region thereof, which are both aspheric, and the fifth lens element 1050 is made of plastic. Moreover, the object-side surface 1051 has at least one critical point in an off-axis region thereof.

The sixth lens element 1060 with negative refractive power has an object-side surface 1061 being concave in a paraxial region thereof and an image-side surface 1062 being concave in a paraxial region thereof, which are both aspheric, and the sixth lens element 1060 is made of plastic. Moreover, the image-side surface 1062 has at least one critical point including at least one convex critical point in an off-axis region thereof.

An IR-cut filter 1070 is located between the sixth lens element 1060 and an image surface 1080. The IR-cut filter 1070 is made of glass and it does not affect the focal length of the optical image capturing lens assembly. The image sensor 1090 is disposed on or near the image surface 1080 of the optical image capturing lens assembly.

The detailed optical data of the 10th embodiment are shown in TABLE 19, and the aspheric surface data of the 10th embodiment are shown in TABLE 20, wherein the units of the curvature radius, the thickness and the focal length are expressed in mm, and HFOV is defined as half of the maximum field of view.

TABLE 19

(10th Embodiment)
f = 5.74 mm, Fno = 2.77, HFOV = 34.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.610 | ASP | 0.777 | Plastic | 1.614 | 26.0 | −36.16 |
| 2 | | 6.979 | ASP | 1.521 | | | | |
| 3 | Lens 2 | 4.656 | ASP | 2.187 | Plastic | 1.544 | 56.0 | 5.67 |
| 4 | | −7.620 | ASP | 0.024 | | | | |
| 5 | Ape. Stop | Plano | | 0.258 | | | | |
| 6 | Lens 3 | −192.308 | ASP | 0.400 | Plastic | 1.582 | 30.2 | −4.74 |
| 7 | | 2.804 | ASP | 0.124 | | | | |
| 8 | Lens 4 | 4.202 | ASP | 1.646 | Plastic | 1.511 | 56.8 | 3.42 |
| 9 | | −2.593 | ASP | 0.040 | | | | |
| 10 | Lens 5 | 2.632 | ASP | 0.533 | Plastic | 1.544 | 56.0 | −19.55 |
| 11 | | 1.960 | ASP | 1.662 | | | | |
| 12 | Lens 6 | −18.658 | ASP | 0.460 | Plastic | 1.566 | 37.4 | −5.21 |
| 13 | | 3.534 | ASP | 0.400 | | | | |
| 14 | IR-cut filter | Plano | | 0.300 | Glass | 1.517 | 64.2 | — |
| 15 | | Plano | | 0.414 | | | | |
| 16 | Image surface | Plano | | — | | | | |

Note:
Reference wavelength is d-line 587.6 nm

TABLE 20

Aspheric Coefficients

| Surface # | 1 | 2 | 3 | 4 |
|---|---|---|---|---|
| k = | 9.3411E−02 | −1.6420E−01 | −1.7433E+00 | −3.8758E−01 |
| A4 = | −1.5273E−06 | −2.6211E−04 | −2.5909E−03 | −1.6091E−03 |
| A6 = | 1.9824E−07 | 7.3320E−05 | −2.6932E−05 | −1.7343E−03 |
| A8 = | −4.2149E−09 | −2.6669E−06 | −1.1039E−04 | 4.0396E−05 |

| Surface # | 6 | 7 | 8 | 9 |
|---|---|---|---|---|
| k = | −9.0000E+01 | −7.8183E−01 | −3.0144E+01 | −5.7080E−01 |
| A4 = | −4.8624E−02 | −5.8457E−02 | 3.9153E−02 | −9.8638E−03 |
| A6 = | 2.0811E−02 | 2.1525E−02 | −3.6405E−02 | 6.7003E−03 |
| A8 = | −8.1665E−03 | −6.5730E−03 | 1.8418E−02 | −7.2299E−03 |
| A10 = | | 2.4525E−03 | −3.7190E−03 | 3.4427E−03 |
| A12 = | | −6.6203E−04 | 2.4740E−04 | −9.0581E−04 |
| A14 = | | | | 1.2700E−04 |

| Surface # | 10 | 11 | 12 | 13 |
|---|---|---|---|---|
| k = | −1.0678E+01 | −1.7569E+00 | −9.0000E+01 | −2.1340E+01 |
| A4 = | 2.9030E−02 | −1.4411E−02 | −9.2242E−02 | −3.9403E−02 |
| A6 = | −2.8647E−02 | 2.1283E−03 | 3.3809E−02 | 1.1227E−02 |
| A8 = | 1.0336E−02 | −2.9350E−03 | −1.1191E−02 | −2.6511E−03 |
| A10 = | −3.2575E−03 | 1.3096E−03 | 3.0421E−03 | 4.3839E−04 |
| A12 = | 6.5945E−04 | −2.6628E−04 | −5.2691E−04 | −4.6164E−05 |
| A14 = | −5.7596E−05 | 2.6787E−05 | 5.1948E−05 | 2.7548E−06 |
| A16 = | | −1.1142E−06 | −2.2452E−06 | −6.9818E−08 |

In the 10th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 10th embodiment are as specified below.

| 10th Embodiment | | | |
|---|---|---|---|
| f [mm] | 5.74 | T56/CT6 | 3.61 |
| Fno | 2.77 | T56/(T34 + T45) | 10.13 |
| HFOV [deg.] | 34.2 | (T56 − SAG52 + SAG61)/T56 | 0.09 |
| V3 | 30.2 | R1/R6 | 3.78 |
| V3 + V4 | 87.0 | R6/|R5| | 0.01 |
| V5 | 56.0 | R12/f | 0.62 |
| V6 | 37.4 | f2/f4 | 1.66 |
| Dr1r4/Dr5r12 | 0.92 | |f6/f5| | 0.27 |
| T12/CT1 | 1.96 | Yc62/Y11 | 0.42 |

11th Embodiment

Figure 12:
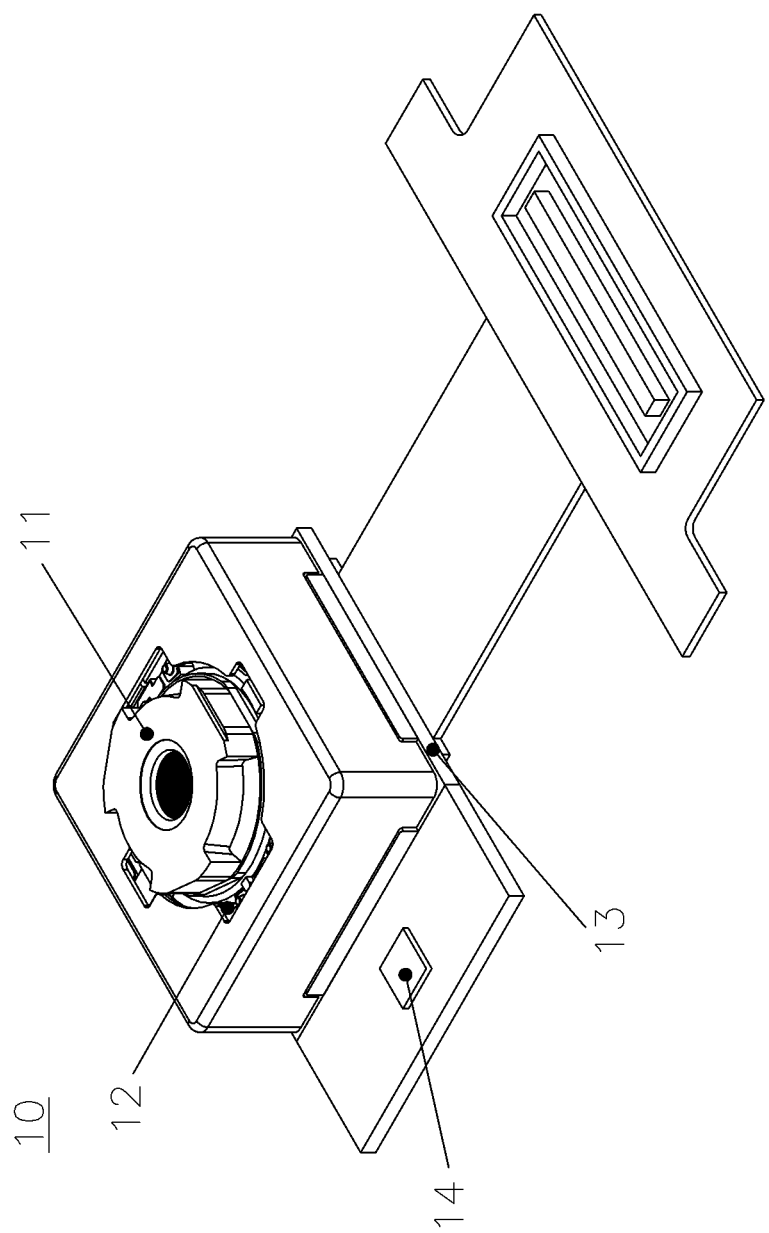
FIG. 12 is a 3-dimensional schematic view of an imaging apparatus according to the 11th embodiment of the present disclosure.

FIG. 12 is a 3-dimensional schematic view of an imaging apparatus 10 according to the 11th embodiment of the present disclosure. In the present embodiment, the imaging apparatus 10 is a camera module. The imaging apparatus 10 includes an image lens 11, a driving device 12, and an image sensor 13. The image lens 11 includes the optical image capturing lens assembly of the aforementioned 1st embodiment and a barrel (not otherwise herein labeled) for carrying the optical image capturing lens assembly. The imaging apparatus 10 retrieves the light and renders an image by using the image lens 11, using the driving device 12 to adjust the focus to make the object imaged on the image sensor 13, and outputs the image data thereafter.

The driving device 12 may be an auto-focus model that can be driven by a voice coil motor (VCM), a micro electro-mechanical system (MEMS), a piezoelectric system, shape memory metal or other driving systems. The driving device 12 allows the optical image capturing lens assembly to obtain a better imaging position, providing a clear image wherever an object being positioned with different object distances.

The imaging apparatus 10 may be configured to equip the image sensor 13 (for example, CCD or CMOS) with high photosensitivity and low noise, disposed on the image surface of the optical image capturing lens assembly to truly provide the satisfactory image quality obtained from the optical image capturing lens assembly.

In addition, the imaging apparatus 10 may further include an image stabilizer 14, which may be a dynamic sensing element such as an accelerometer, a gyroscope or a Hall effect sensor. The image stabilizer 14 in the 11th embodiment is a gyroscope but not limited thereto. By adjusting the optical image capturing lens assembly in different axial directions to provide a compensation for the blurred image due to shaking in a shooting moment, the image quality under dynamic and low-light scenes can further be improved and the enhanced image compensation function such as optical image stabilization (OIS) or electronic image stabilization (EIS) can also be provided.

12th Embodiment

Figure 13A:
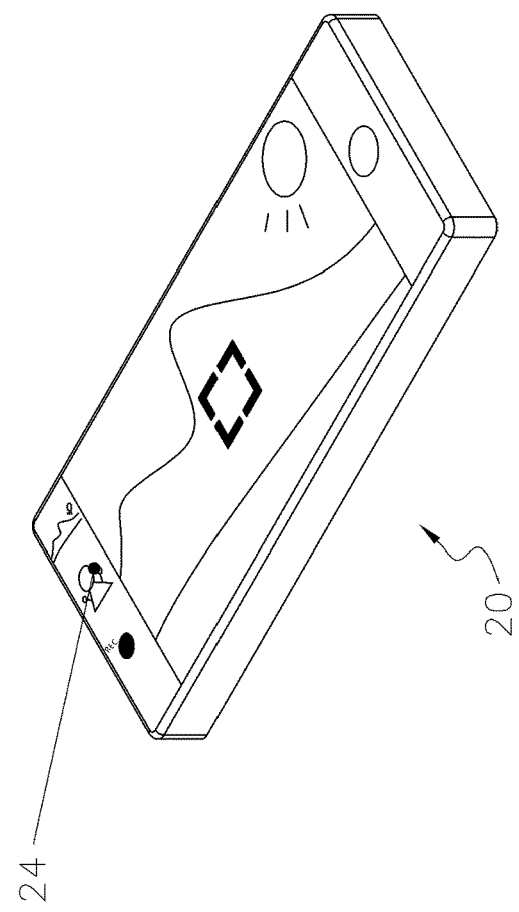
FIG. 13A is a 3-dimensional schematic view of an electronic device according to the 12th embodiment of the present disclosure.
Figure 13A:
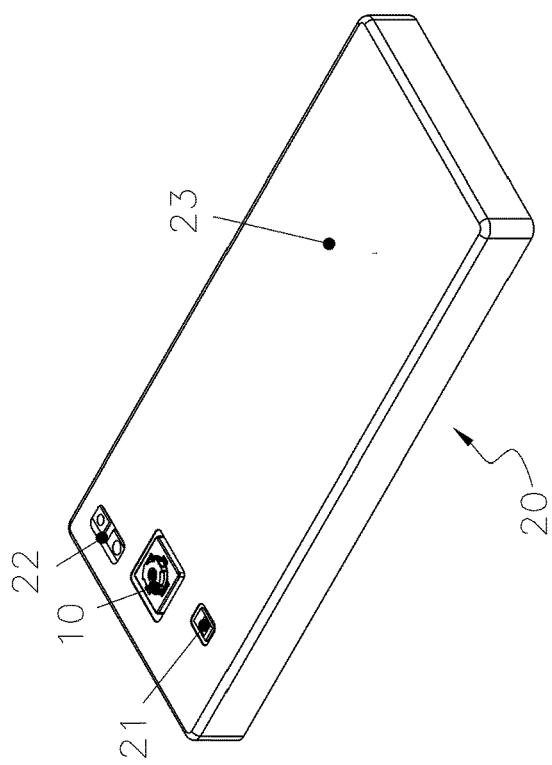
Figure 13B:
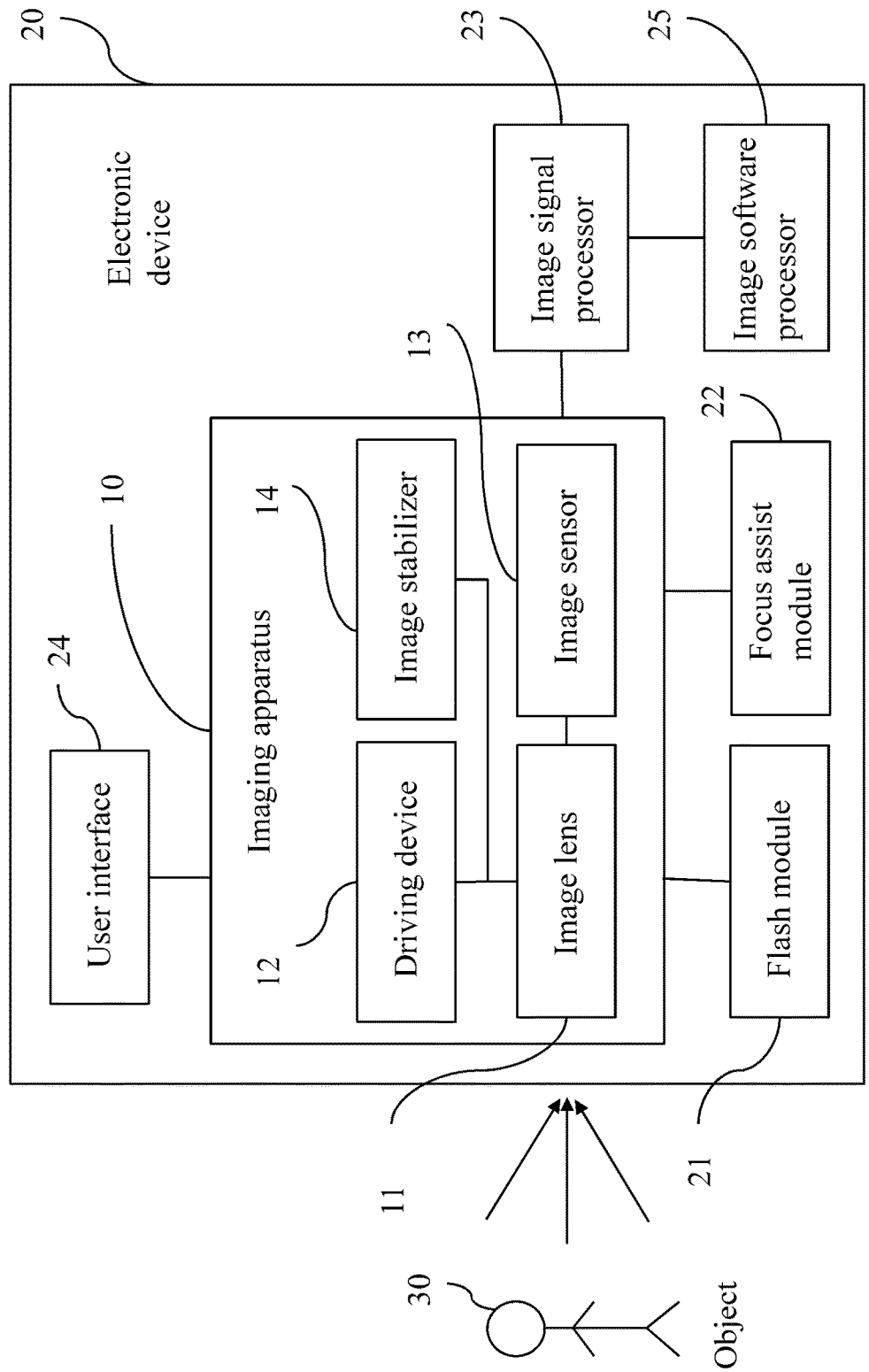
FIG. 13B is a schematic view of the electronic device according to the 12th embodiment.

FIG. 13A is a 3-dimensional schematic view of an electronic device 20 according to the 12th embodiment, and FIG. 13B is a schematic view of the electronic device 20 shown in FIG. 13A. In the present embodiment, the electronic device 20 is a smart phone. The electronic device 20 includes the imaging apparatus 10 of the 11th embodiment, a flash module 21, a focus assist module 22, an image signal processor 23, a user interface 24 and an image software processor 25.

When a user shoots through the user interface 24, the electronic device 20 retrieves the light and renders an image via the imaging apparatus 10, triggers the flash module 21 to compensate the light, and focuses instantly according to the distance information of an object 30 provided by the focus assist module 22. The images are further optimized by the image signal processor 23 to further enhance the image quality generated by the optical image capturing lens assembly. The focus assist module 22 may adopt an infrared ray or laser focus assist system to achieve quick focusing. The user interface 24 may use a touch screen or a physical shooting button cooperated with various functions of the image software processor 25 to perform image capturing and image processing.

The imaging apparatus 10 of the present disclosure is not limited to be applied to the smart phone. The imaging apparatus 10 may be used in a system of moving focus and features in both excellent aberration correction and satisfactory image quality. For example, the imaging apparatus 10 may be applied to a variety of electronic applications such as smart electronic devices, tablets, wearable devices, medical devices, precision instruments, vehicle devices, surveillance cameras, portable video recorders, recognition systems, multi-lens device, motion sensing technology, virtual reality, sports devices and home intelligent auxiliary systems.

Figure 14A:
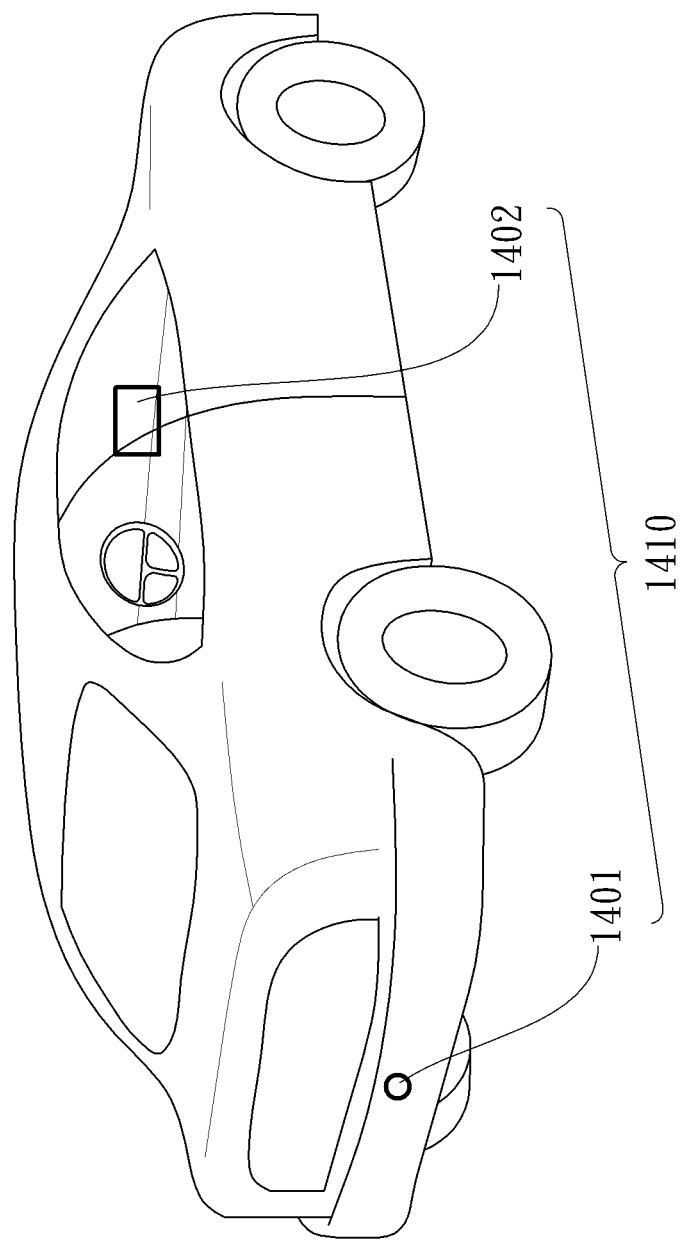
FIG. 14A shows a rear view camera with an imaging apparatus of the present disclosure installed therein.
Figure 14B:
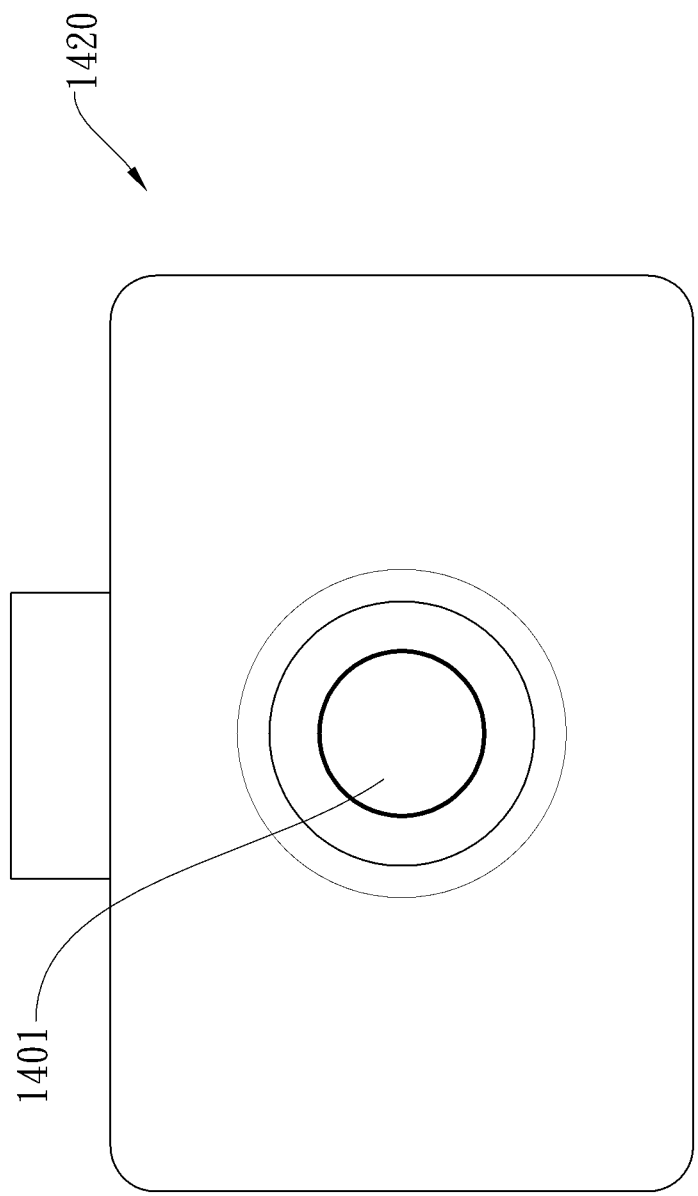
FIG. 14B shows a driving recording system with an imaging apparatus of the present disclosure installed therein.
Figure 14C:
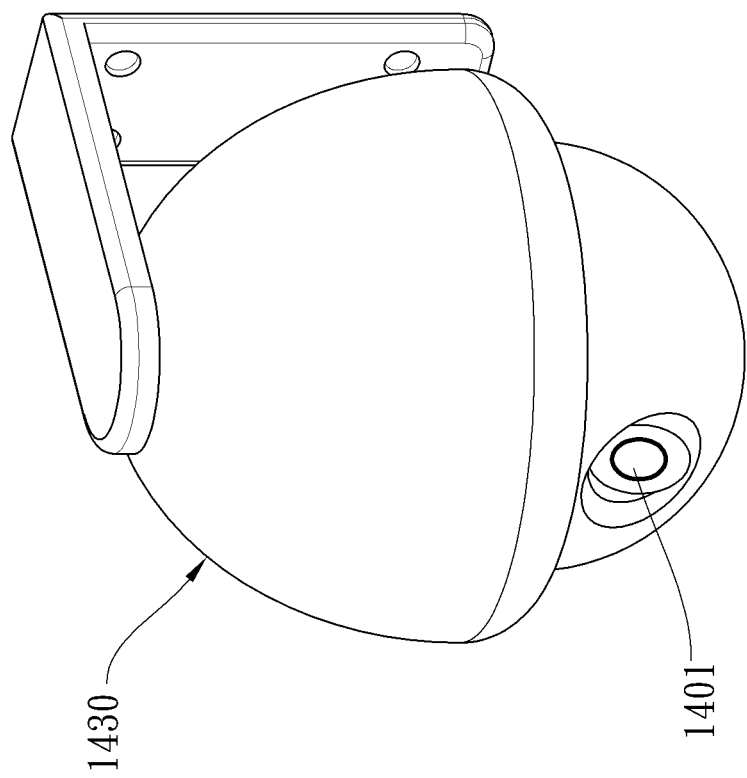
FIG. 14C shows a surveillance camera with an imaging apparatus of the present disclosure installed therein.

Please refer to FIGS. 14A, 14B and 14C, wherein FIG. 14A shows a rear view camera 1410 with an imaging apparatus 1401 of the present disclosure installed therein; FIG. 14B shows a driving recording system 1420 with the imaging apparatus 1401 of the present disclosure installed therein; FIG. 14C shows a surveillance camera 1430 with the imaging apparatus 1401 of the present disclosure installed therein. An electronic device with the imaging apparatus 1401 installed therein can further include a screen 1402 and provide good quality images.

The aforementioned electronic device is merely exemplary of practical use of the present disclosure and does not limit the scope of application of the imaging apparatus of the present disclosure. Preferably, the electronic device can further include a control unit, a display unit, a storage unit, a random access memory unit (RAM) or a combination thereof.

The foregoing description in the tables, for the purpose of illustration, has been compiled with reference to specific embodiments. It is to be noted that TABLES 1-20 show data of the different embodiments; however, the data of the embodiments is obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image capturing lens assembly comprising six lens elements, the six lens elements being, in order from an object side to an image side:
   a first lens element with negative refractive power;
   a second lens element with positive refractive power;
   a third lens element with negative refractive power;
   a fourth lens element with positive refractive power;
   a fifth lens element having an object-side surface being aspheric with at least one critical point in an off-axis region thereof and an image-side surface being concave in a paraxial region thereof; and
   a sixth lens element with negative refractive power having an image-side surface being concave in a paraxial region thereof, the image-side surface of the sixth lens element being aspheric and having at least one critical point in an off-axis region thereof;
   wherein an axial distance between the third lens element and the fourth lens element is T34, an axial distance between the fourth lens element and the fifth lens element is T45, an axial distance between the fifth lens element and the sixth lens element is T56, and the following condition is satisfied:

$0.45 < T56/(T34+T45)$.

2. The optical image capturing lens assembly of claim 1, wherein the axial distance between the third lens element and the fourth lens element is T34, the axial distance between the fourth lens element and the fifth lens element is T45, the axial distance between the fifth lens element and the sixth lens element is T56, and the following condition is satisfied:

$0.65 < T56/(T34+T45) < 28$.

3. The optical image capturing lens assembly of claim 1, wherein the first lens element has an object-side surface being convex in a paraxial region thereof, a curvature radius of the object-side surface of the first lens element is R1, a curvature radius of an image-side surface of the third lens element is R6, and the following condition is satisfied:

$0.76 < R1/R6 < 5.0$.

4. The optical image capturing lens assembly of claim 1, wherein a vertical distance between a maximum effective diameter position on an object-side surface of the first lens element and an optical axis is Y11, a vertical distance between the at least one critical point closet to the optical axis in the off-axis region of the image-side surface of the sixth lens element and the optical axis is Yc62, and the following condition is satisfied:

$0.15 < Yc62/Y11 < 0.90$.

5. The optical image capturing lens assembly of claim 1, wherein an Abbe number of the third lens element is V3, an Abbe number of the fourth lens element is V4, and the following condition is satisfied:

$65 < V3+V4$.

6. The optical image capturing lens assembly of claim 1, wherein an axial distance between the first lens element and the second lens element is T12, a central thickness of the first lens element is CT1, and the following condition is satisfied:

$0.85 < T12/CT1$.

7. The optical image capturing lens assembly of claim 1, wherein the axial distance between the fifth lens element and the sixth lens element is T56, a central thickness of the sixth lens element is CT6, and the following condition is satisfied:

$0.54 < T56/CT6 < 6.5$.

8. The optical image capturing lens assembly of claim 7, wherein the axial distance between the fifth lens element and the sixth lens element is T56, the central thickness of the sixth lens element is CT6, and the following condition is satisfied:

$1.5 < T56/CT6 < 5.0$.

9. The optical image capturing lens assembly of claim 7, wherein an axial distance between an object-side surface of the first lens element and an image-side surface of the second lens element is Dr1r4, an axial distance between an object-side surface of the third lens element and the image-side surface of the sixth lens element is Dr5r12, and the following condition is satisfied:

$0.68 < Dr1r4/Dr5r12 < 3.0$.

10. The optical image capturing lens assembly of claim 1, wherein the axial distance between the fifth lens element and the sixth lens element is T56, a displacement in parallel with an optical axis from an axial vertex on the image-side surface of the fifth lens element to a maximum effective diameter position on the image-side surface of the fifth lens element is SAG52, a displacement in parallel with the optical axis from an axial vertex on an object-side surface of the sixth lens element to a maximum effective diameter position on the object-side surface of the sixth lens element is SAG61, and the following condition is satisfied:

$(T56 - SAG52 + SAG61)/T56 < 0.75$.

11. The optical image capturing lens assembly of claim 1, wherein a focal length of the second lens element is f2, a focal length of the fourth lens element is f4, and the following condition is satisfied:

$0.78 < f2/f4 < 4.0$.

12. The optical image capturing lens assembly of claim 1, wherein a focal length of the fifth lens element is f5, a focal length of the sixth lens element is f6, and the following condition is satisfied:

$|f6/f5| < 0.75$.

13. The optical image capturing lens assembly of claim 1, wherein the third lens element has an image-side surface being concave in a paraxial region thereof, a curvature radius of an object-side surface of the third lens element is R5, a curvature radius of the image-side surface of the third lens element is R6, and the following condition is satisfied:

$0 < R6/|R5| < 0.55$.

14. The optical image capturing lens assembly of claim 1, wherein the fourth lens element has an object-side surface and an image-side surface both being convex in a paraxial region thereof.

15. The optical image capturing lens assembly of claim 1, wherein the fifth lens element has negative refractive power.

16. The optical image capturing lens assembly of claim 1, wherein the sixth lens element has an object-side surface being convex in a paraxial region thereof.

17. The optical image capturing lens assembly of claim 1, wherein at least one lens element of the first lens element and the second lens element is made of glass.

18. An imaging apparatus, comprising the optical image capturing lens assembly of claim 1 and an image sensor.

19. An electronic device, comprising the imaging apparatus of claim 18.

20. An optical image capturing lens assembly comprising six lens elements, the six lens elements being, in order from an object side to an image side:
    a first lens element with negative refractive power;
    a second lens element with positive refractive power;
    a third lens element with negative refractive power;
    a fourth lens element with positive refractive power;
    a fifth lens element having an image-side surface being concave in a paraxial region thereof, at least one surface of an object-side surface and the image-side surface of the fifth lens element being aspheric and having at least one critical point in an off-axis region thereof; and
    a sixth lens element with negative refractive power;
    wherein an axial distance between the third lens element and the fourth lens element is T34, an axial distance between the fourth lens element and the fifth lens element is T45, an axial distance between the fifth lens element and the sixth lens element is T56, an Abbe number of the sixth lens element is V6, and the following condition is satisfied:

$0.55 < T56/(T34+T45) < 32$; and $10 < V6 < 40$.

21. The optical image capturing lens assembly of claim 20, wherein the axial distance between the third lens element and the fourth lens element is T34, the axial distance between the fourth lens element and the fifth lens element is T45, the axial distance between the fifth lens element and the sixth lens element is T56, and the following condition is satisfied:

$0.85 < T56/(T34+T45) < 24$.

22. The optical image capturing lens assembly of claim 20, wherein an axial distance between an object-side surface of the first lens element and an image-side surface of the second lens element is Dr1r4, an axial distance between an object-side surface of the third lens element and an image-side surface of the sixth lens element is Dr5r12, and the following condition is satisfied:

$0.68 < Dr1r4/Dr5r12 < 3.0$.

23. The optical image capturing lens assembly of claim 20, wherein the sixth lens element has an image-side surface being concave in a paraxial region thereof, a curvature radius of the image-side surface of the sixth lens element is R12, a focal length of the optical image capturing lens assembly is f, and the following condition is satisfied:

$0 < R12/f < 5.0$.

24. An optical image capturing lens assembly comprising six lens elements, the six lens elements being, in order from an object side to an image side:
    a first lens element with negative refractive power;
    a second lens element with positive refractive power;
    a third lens element with negative refractive power;
    a fourth lens element with positive refractive power;
    a fifth lens element; and
    a sixth lens element with negative refractive power having an image-side surface being concave in a paraxial region thereof, the image-side surface of the sixth lens element being aspheric and having at least one critical point in an off-axis region thereof;
    wherein an axial distance between the third lens element and the fourth lens element is T34, an axial distance between the fourth lens element and the fifth lens element is T45, an axial distance between the fifth lens element and the sixth lens element is T56, a curvature radius of an object-side surface of the first lens element is R1, a curvature radius of an image-side surface of the third lens element is R6, a focal length of the fifth lens element is f5, a focal length of the sixth lens element is f6, and the following conditions are satisfied:

$1.1 < T56/(T34+T45) < 20;$ $0.60 < R1/R6 < 19;$ and $|f6/f5| < 0.75.$

25. The optical image capturing lens assembly of claim 24, wherein the curvature radius of the object-side surface of the first lens element is R1, the curvature radius of the image-side surface of the third lens element is R6, and the following condition is satisfied:

$0.76 < R1/R6 < 12.7.$

26. The optical image capturing lens assembly of claim 24, wherein an axial distance between the object-side surface of the first lens element and an image-side surface of the second lens element is Dr1r4, an axial distance between an object-side surface of the third lens element and the image-side surface of the sixth lens element is Dr5r12, and the following condition is satisfied:

$0.78 < Dr1r4/Dr5r12 < 2.5.$

27. The optical image capturing lens assembly of claim 24, wherein an Abbe number of the third lens element is V3, an Abbe number of the fifth lens element is V5, an Abbe number of the sixth lens element is V6, and the following conditions are satisfied:

$10 < V3 < 40;$ $10 < V5 < 40;$ and $10 < V6 < 40.$

28. An optical image capturing lens assembly comprising six lens elements, the six lens elements being, in order from an object side to an image side:
   a first lens element with negative refractive power;
   a second lens element with positive refractive power;
   a third lens element with negative refractive power;
   a fourth lens element with positive refractive power;
   a fifth lens element having an object-side surface being aspheric with at least one critical point in an off-axis region thereof and an image-side surface being concave in a paraxial region thereof; and
   a sixth lens element with negative refractive power having an image-side surface being aspheric, and the image-side surface of the sixth lens element having at least one critical point in an off-axis region thereof;
   wherein an axial distance between the third lens element and the fourth lens element is T34, an axial distance between the fourth lens element and the fifth lens element is T45, an axial distance between the fifth lens element and the sixth lens element is T56, a vertical distance between a maximum effective diameter position on an object-side surface of the first lens element and an optical axis is Y11, a vertical distance between the at least one critical point closet to the optical axis in the off-axis region of the image-side surface of the sixth lens element and the optical axis is Yc62, and the following conditions are satisfied:

$0.10 < T56/(T34+T45);$ and $0.15 < Yc62/Y11 < 0.90.$

29. The optical image capturing lens assembly of claim 28, wherein the sixth lens element has the image-side surface being concave in a paraxial region thereof, and the at least one critical point in the off-axis region of the image-side surface of the sixth lens element comprises at least one convex critical point.

30. The optical image capturing lens assembly of claim 28, wherein an axial distance between the object-side surface of the first lens element and an image-side surface of the second lens element is Dr1r4, an axial distance between an object-side surface of the third lens element and the image-side surface of the sixth lens element is Dr5r12, and the following condition is satisfied:

$0.55 < Dr1r4/Dr5r12 < 3.5.$

31. The optical image capturing lens assembly of claim 28, wherein an axial distance between the first lens element and the second lens element is T12, a central thickness of the first lens element is CT1, and the following condition is satisfied:

$0.85 < T12/CT1.$

32. The optical image capturing lens assembly of claim 28, wherein the axial distance between the fifth lens element and the sixth lens element is T56, a central thickness of the sixth lens element is CT6, and the following condition is satisfied:

$0.54 < T56/CT6 < 6.5.$

33. The optical image capturing lens assembly of claim 28, wherein a curvature radius of the object-side surface of the first lens element is R1, a curvature radius of an image-side surface of the third lens element is R6, and the following condition is satisfied:

$0.76 < R1/R6 < 5.0.$

* * * * *